(12) United States Patent
Brumbaugh et al.

(10) Patent No.: US 7,865,388 B2
(45) Date of Patent: Jan. 4, 2011

(54) APPARATUS AND METHOD FOR PROVIDING PROGRAM PROTECTION ENGINEERING, SECURITY MANAGEMENT, AND REPORT PREPARATION FOR SENSITIVE AND CLASSIFIED PROJECTS

(75) Inventors: Kenneth Leroy Brumbaugh, Ashburn, VA (US); Howard Bruce Low, Shepherdstown, WV (US); Gregory Chase Hamilton, Rockville, MD (US); James Elbert Davis, Jr., Manassas, VA (US); Wendy Yijun Fan, Centreville, VA (US)

(73) Assignee: TASC, Inc., Reading, MA (US)

( * ) Notice: Subject to any disclaimer, the term of this patent is extended or adjusted under 35 U.S.C. 154(b) by 1369 days.

(21) Appl. No.: 11/347,285

(22) Filed: Feb. 6, 2006

(65) Prior Publication Data

US 2007/0186283 A1     Aug. 9, 2007

(51) Int. Cl.
    *G06Q 10/00* (2006.01)
(52) U.S. Cl. .............................. 705/9; 717/100; 726/2
(58) Field of Classification Search ................. 717/100; 726/2
    See application file for complete search history.

(56) References Cited

U.S. PATENT DOCUMENTS

| | | | |
|---|---|---|---|
| 6,591,278 B1 * | 7/2003 | Ernst ................................... 1/1 |
| 2003/0135399 A1 * | 7/2003 | Ahamparam et al. ........... 705/7 |
| 2003/0160818 A1 * | 8/2003 | Tschiegg et al. ............ 345/743 |
| 2004/0210470 A1 * | 10/2004 | Rusk .............................. 705/9 |
| 2004/0255265 A1 * | 12/2004 | Brown et al. ................. 717/101 |
| 2006/0053125 A1 * | 3/2006 | Scott ........................... 707/100 |

OTHER PUBLICATIONS

Institute of Electrical and Electronic Engineers. "Software Engineering: Software Life-Cycle Processes, Risk Management." Proposed Standard. New York: IEEE, 2004 http://standards.ieee.org/announcements/pr_p1540.html.*
Project Management Institute. A Guide to the Project Management Body of Knowledge (PMBOK Guide). Newton Square, PA: Project Management Institute, 1996 www.pmibookstore.org/productdetail.asp?productid= 4106.*

* cited by examiner

*Primary Examiner*—Beth V Boswell
*Assistant Examiner*—Adrian J McPhillip
(74) *Attorney, Agent, or Firm*—Steptoe & Johnson LLP

(57) ABSTRACT

An apparatus and method using a program protection engineering (P2E) toolkit to provide program protection engineering, security management, and report preparation for sensitive and classified projects. The P2E toolkit is an implementation of security policies, procedures, and methodologies associated with acquisition programs. Acquisition programs may range from large-scale classified systems for the government to sensitive corporate acquisition programs focusing on company proprietary or intellectual property issues. Specifically, the P2E toolkit provides end-to-end program protection engineering, security management, and report preparation for sensitive and classified programs throughout the program lifecycle, and assists security professionals and program managers to make appropriate decisions to protect their acquisition programs from compromise due to foreign intelligence threats or corporate/industrial espionage. The P2E toolkit enhances the traditional program management concerns of technical performance, schedule, and cost, by adding lifecycle protection as in integral component.

51 Claims, 31 Drawing Sheets

FIG. 5B

SYSTEM PROGRAMMATICS MODULE INTERFACE EXEMPLAR - 890

FIG. 8B

VULNERABILITY ASSESSMENT PROCESS - 985

4. RESIDUAL RISK ASSESSMENT:

A. SELECT THE DESCRIPTION THAT APPLIES TO THE RESIDUAL RISK FOR THIS CPI/CSR/CRT.
- o CRITICAL - LACK OF EFFECTIVE COUNTERMEASURES TO COLLECT CPI/CSR/CRT WILL ALLOW THREATS TO EXPLOIT EXPOSURE OF CPI/CSR/CRT
- o HIGH - INCONSISTENCIES OF COUNTERMEASURES LEAVE MULTIPLE SUSCEPTIBILITIES THROUGH WHICH THREATS WOULD BE CAPABLE OF EXPLOITING EXPOSURE OF CPI/CSR/CRT
- o MEDIUM - COUNTERMEASURES ARE IN PLACE, BUT AT LEAST ONE UNMITIGATED SUSCEPTIBILITY EXISTS THROUGH WHICH THREATS WOULD BE CAPABLE OF EXPLOITING EXPOSURE OF CPI/CSR/CRT
- o LOW - MULTIPLE LAYERS OF EFFECTIVE COUNTERMEASURES EXIST. FEW OR NO KNOWN THREATS WOULD BE CAPABLE OF EXPLOITING EXPOSURES OF CPI/CSR/CRT
- o UNKNOWN - NO DATA ON WHICH TO BASE AN ANALYSIS

B. ACCEPT RECOMMENDED ASSESSMENT OF RESIDUAL RISK?
- o YES
- o NO...PROVIDE JUSTIFICATION

C. RECORD THIS VALUE AS THE RESIDUAL RISK: R

USING VUNERABILITY ASSESSMENT AND COUNTERMEASURE EFFECTIVENESS

APPLY RISK CUBE TO DETERMINE RESIDUAL RISK

3. COUNTERMEASURE EFFECTIVENESS ASSESSMENT:

A. IDENTIFY "SIGNATURES" FOR THIS CPI/CSR/CRT.

B. IDENTIFY ACTIVE AND PASSIVE COUNTERMEASURES REQUIRED TO MITIGATE THESE "SIGNATURES."

C. SELECT THE DESCRIPTION THAT APPLIES TO THE COUNTERMEASURE EFFECTIVENESS ASSESSMENT FOR THIS CPI/CSR/CRT.
- o CRITICAL - THERE ARE NO COUNTERMEASURES IN PLACE TO MITIGATE COLLECTION AND ANALYSIS
- o HIGH - THERE ARE SOME EFFECTIVE COUNTERMEASURES IN PLACE, BUT SIGNIFICANT UNMITIGATED SUSCEPTIBILITIES TO SUCCESSFUL COLLECTION AND ANALYSIS REMAIN
- o MEDIUM - THE MAJORITY OF COUNTERMEASURES IN PLACE ARE EFFECTIVE, HOWEVER SOME PERIPHERAL SUSCEPTIBILITIES TO SUCCESSFUL COLLECTION AND ANALYSIS REMAIN
- o LOW - MULTIPLE LAYERS OF EFFECTIVE COUNTERMEASURES EXIST
- o UNKNOWN - NO DATA ON WHICH TO BASE AN ANALYSIS

RESIDUAL RISK ASSESSMENT PROCESS - 990

FIG. 9G

5x5 ASSESSMENT MATRIX EXEMPLAR - 995

| | A | B | C | D | E |
|---|---|---|---|---|---|
| E | C (YELLOW) | C (YELLOW) | D (RED) | D (RED) | D (RED) |
| D | B (GREEN) | C (YELLOW) | C (YELLOW) | D (RED) | D (RED) |
| C | B (GREEN) | B (GREEN) | C (YELLOW) | C (YELLOW) | D (RED) |
| B | B (GREEN) | B (GREEN) | B (GREEN) | C (YELLOW) | C (YELLOW) |
| A | A (WHITE) | B (GREEN) | B (GREEN) | B (GREEN) | C (YELLOW) |

*FIG. 9H*

REPORT MODULE INTERFACE EXEMPLAR - 1080

NORTHROP GRUMMAN
*TASC*

ADMINISTRATION:
HELP:

PHASES: CONCEPT REFINEMENT
TOOLS: REPORTS

TECHNOLOGY PROTECTION PLAN
SYSTEM SECURITY PLAN
PROGRAM PROTECTION PLAN
PROGRAM SECURITY PLAN
CPI REPORT
SECURITY CLASSIFICATION GUIDE
QUESTIONNAIRE REPORT
CI INTEGRATED THREAT ASSESSMENT (CITA)
TECHNOLOGY ASSESSMENT/CONTROL PLAN (TACP)
CPI REPORT STATUS

CPI SUMMARY REPORT

| CPI | CRITICALITY RATING | SUSCEPTIBILITY RATING | THREAT RATING | VULNERABILITY RATING | COUNTERMEASURE RATING | RESIDUAL RISK | PROGRAM RISK | RISK PERCENTAGE |
|---|---|---|---|---|---|---|---|---|
| FORWARD FUSELAGE BULKHEAD MACHINED ALUMINUM ALLOY | CRITICAL | CRITICAL | CRITICAL | CRITICAL | CRITICAL | CRITICAL | 0.7 | 50% |
| AVIONICS AND ELECTRICAL | HIGH (R) | CRITICAL | CRITICAL | HIGH (R) | CRITICAL | HIGH (R) | 0.6 | 40% |
| NOSE FAIRING-COMPOSTITE | MEDIUM (Y) | CRITICAL | CRITICAL | HIGH (R) | CRITICAL | HIGH (R) | 0.3 | 5% |
| STRUCTURE AND GENERAL | LOW (G) | CRITICAL | HIGH (R) | HIGH (R) | MEDIUM (Y) | MEDIUM (Y) | 0.1 | 0% |
| PROGRAM NAME | MEDIUM (Y) | UNKNOWN (W) | HIGH (R) | LOW (G) | LOW (G) | LOW (G) | 0.1 | 0% |

OVERALL RISK VALUE: 1.4 OUT OF 2.2 (Y)
OVERALL RISK RATING: MEDIUM

FIG. 10C

OVERALL PROGRAM RISK EQUATION - 1090

$$PR = \frac{\Sigma \omega_i R_i}{\sqrt{\Sigma(\omega_i R_i^2)}}$$

FIG. 10D

TOOLKIT ADMINISTRATIVE MODULE INTERFACE EXEMPLAR - 1290

FIG. 12B

| TOOL NAME | DESCRIPTION | STATUS | DISPLAY ORDER | NAVIGATION # | MAIN MENU |
|---|---|---|---|---|---|
| PROGRAM INFORMATION | PROGRAM INFORMATION | 1 | 1 | 290 | 1 |
| PROTECTION STRATEGY ASSESSMENT | PROTECTION STRATEGY ASSESSMENT | 1 | 2 | 222 | 0 |
| PROGRAM TIMELINE | PROGRAM TIMELINE | 1 | 3 | 200 | 1 |
| SYSTEM DECONSTRUCTION | SYSTEM DECONSTRUCTION | 1 | 4 | 210 | 1 |
| SYSTEM PROGRAMMATICS | SYSTEM PROGRAMMATICS | 1 | 5 | 230 | 1 |
| OBSERVABLE NOTEBOOK | OBSERVABLE NOTEBOOK | 1 | 6 | 220 | 1 |
| COUNTERMEASURES | COUNTERMEASURES | 1 | 7 | 240 | 0 |
| COST ESTIMATION | COST ESTIMATION | 1 | 8 | 250 | 1 |
| GRAY ZONE ISSUES | GRAY ZONE ISSUES | 1 | 9 | 260 | 0 |
| CRITICALITY MAPPING | CRITICALITY MAPPING | 1 | 10 | 225 | 0 |
| ELIGIBILITY DETERMINATION | ELIGIBILITY DETERMINATION | 1 | 11 | 280 | 0 |
| CLASSIFICATION LEVEL | CLASSIFICATION LEVEL | 1 | 12 | 265 | 0 |
| SCI DETERMINATION | SCI DETERMINATION | 1 | 13 | 275 | 0 |
| SAP/SAR | SAP/SAR | 1 | 14 | 285 | 0 |
| REPORTS | REPORTS | 1 | 15 | 300 | 1 |
| CRITICALITY ASSESSMENT | CRITICALITY ASSESSMENT | 1 | 16 | 205 | 0 |
| THREAT ASSESSMENT | THREAT ASSESSMENT | 1 | 17 | 215 | 0 |
| VULNERABILITY ASSESSMENT | VULNERABILITY ASSESSMENT | 1 | 18 | 235 | 0 |
| RESIDUAL RISK ASSESSMENT | RESIDUAL RISK ASSESSMENT | 1 | 19 | 245 | 0 |

APPARATUS AND METHOD FOR PROVIDING PROGRAM PROTECTION ENGINEERING, SECURITY MANAGEMENT, AND REPORT PREPARATION FOR SENSITIVE AND CLASSIFIED PROJECTS

TECHNICAL FIELD

The technical field relates to program management, and, in particular, to an apparatus and method for providing program protection engineering, security management, and report preparation for sensitive and classified projects.

BACKGROUND

The Project Management Book of Knowledge (PMBOK) defines program management as the application of knowledge, skills, tools, and techniques to project activities in order to meet or exceed stakeholder needs and expectations from a project. Meeting or exceeding stakeholder needs and expectations invariably involves balancing competing demands among: scope, time, cost, and quality; stakeholders with differing needs and expectations; identified requirements (needs) and unidentified requirements (expectations). The PMBOK further defines nine knowledge areas within project management including Project Risk Management. PMBOK further specifies four major processes of: risk identification, risk quantification, risk response development, and risk response control.

Program Management applies to a wide variety of projects. Classified projects are sponsored by the U.S. Government and focus on a wide variety of systems including national security, military services, and law enforcement. Sensitive projects are also relevant to these organizations but can also encompass company proprietary, intellectual property, or legal liability issues.

For any acquisition program, particularly those dealing with national security, it is vital to identify the critical elements of the program and their vulnerabilities in order to mitigate any threat. Organizations involved in classified activities are required, by law, federal statute, or organizational policy, to perform extensive Integrated System Security (ISS) engineering tasks. ISS is a set of integrated processes, applied to all aspects of a system, that identify security vulnerabilities and determine countermeasures to eliminate or mitigate unacceptable risks to a system. The purpose of any ISS program is to identify security concerns from the earliest point in an acquisition program when the value of key information or technologies is recognized and to continually assess and monitor. Early identification of critical program elements prevents exploitation of U.S. technologies and the development of countermeasures against them by foreign adversaries, and assists in the management of security risks over the entire lifecycle of the system. In the era of risk management, program managers need solid information on which to decide where scarce resources need to be allocated.

Corporations, businesses, or individuals developing new products or processes also need to consider protecting their inventions; trade secrets, and other proprietary and intellectual property that may be vulnerable to external and internal threats (e.g., industrial espionage or insider threats). Legal liability concerns also need careful scrutiny to help ensure that products cannot be tampered with in a malicious sense or used for purposes contrary to their originally intended purpose. ISS processes and procedures are equally applicable for these types of sensitive projects.

Most of this planning is subjective and requires significant individual expertise and extensive training. For government organizations, acquisition security training is provided by organizations like the Defense Acquisition University or the Defense Security Services Academy. Corporate training is typically through internally supported courses or seminars. Teaching and applying systems engineering principles to standardize embedded risk management tasks allows users to automate many of these tasks, generate necessary documentation, and overcome inexperience and training limitations.

The traditional approach to managing risk is to identify risks, quantify those risks, develop responses/countermeasures to mitigate or eliminate the risks, and to control any remaining residual risks. Typically a risk rating matrix is applied to the three areas of technical performance, schedule, and cost. These three components have been the central focus of risk management. A major component that is lacking in this model is to apply ISS and Security System Engineering principles to lifecycle protection.

Acquisition lifecycle models have been developed for the Intelligence Community (IC), the Department of Defense (DoD), National Security Space (NSS), the National Reconnaissance Office (NRO), and the National Aeronautics and Space Administration (NASA). The program protection and security aspects of these models follow the same basic methodology: what do we protect, why do we protect it, who do we protect it from, when and where do we protect it, and how do we protect it. Lifecycles are divided into phase groups, which are further divided into phases. Each phase has a set of milestones, activities, and reports. These lifecycle models represent a definitive approach to defining the process for security policies, procedures, and requirements for an entire acquisition lifecycle. Currently, security professionals would follow these processes and manually compile and process data. There was no comprehensive automated means for performing these tasks and no means for effectively managing and tracking the information. This often led to inconsistencies in the process and a lack of standardization and accountability.

SUMMARY

An apparatus for providing program protection engineering, security management, and report preparation for sensitive and classified projects includes a program protection engineering (P2E) toolkit. The P2E toolkit has a core architectural module that provides internal navigational controls, standard style sheets, and standard color palettes, database connectivity, text string functions, date functions, encryption and decryption algorithms, user permission functions, hidden data value transfer functions, window functions, table handling functions, floating menu handling functions, combo box and list box functions, frame functions, menu functions, image functions, document and report functions, sorting functions, and password validation functions. The P2E toolkit includes a program information module that provides information on a user specified acquisition program. The P2E toolkit includes a timeline module that provides and displays a timeline of the user specified acquisition program. The toolkit also contains a system deconstruction module that identifies the technical components of the program that need security protections and a system programmatics module that identifies those programmatic components requiring security protection. The P2E toolkit further includes a questionnaire module that presents questionnaires to determine factors including criticality, vulnerabilities, threats, susceptibilities, countermeasures, and a residual risk for each technical component and each programmatic component that need security protections. The P2E toolkit further includes a report module that provides a report based on user specified reporting requirements of the user specified acquisition program. The P2E toolkit may further include an observable notebook module that provides information and manages operational security concerns and a toolkit administrative module that manages user accounts and user permissions. The P2E toolkit may support the incorporation of future modules that may be developed at a later date.

A method for providing program protection engineering, security management, and report preparation for sensitive and classified projects includes enabling a user to login to a P2E toolkit. The method further includes enabling the user to specify an acquisition program that includes technical components and programmatic components, and copying variables from a master database to a program specific database. The variables include timeline phase groups, phases, milestones, protection activities for the specified acquisition program, and templates for required report documents. The method further includes providing and displaying a timeline of the specified acquisition program, identifying the technical components that need security protections, and identifying critical technical components using questionnaires directed to the technical components. The method further includes determining factors including criticality, vulnerabilities, threats, susceptibilities, countermeasures, and a residual risk for each technical component that needs security protections, identifying the programmatic components that need security protections, and identifying critical system programmatics components using questionnaires directed to the programmatic components. The method further includes determining factors including criticality, vulnerabilities, threats, susceptibilities, countermeasures, and a residual risk for each programmatic component that needs security protections, and providing reports based on timeline phase and specific acquisition program reporting requirements. The method may further include providing a observable notebook to identify, track, and manage operational security issues throughout an acquisition lifecycle and providing a toolkit administrative module to manage user accounts and toolkit configuration. The method further includes the capability to incorporate future modules as they are developed.

A computer readable medium provides instructions for providing program protection engineering, security management, and report preparation for sensitive and classified projects. The instructions include enabling a user to login to a P2E toolkit. The instructions further include enabling the user to specify an acquisition program that includes technical components and programmatic components, and copying variables from a master database to a program specific database. The variables include timeline phase groups, phases, milestones, protection activities for the specified acquisition program, and templates for required report documents. The instructions further include providing and displaying a timeline of the specified acquisition program, identifying the technical components that need security protections, and identifying critical technical components using questionnaires directed to the technical components. The instructions further include determining factors including criticality, vulnerabilities, threats, susceptibilities, countermeasures, and a residual risk for each technical component that needs security protections, identifying the programmatic components that need security protections, and identifying critical system programmatics components using questionnaires directed to the programmatic components. The instructions further include determining factors including criticality, vulnerabilities, threats, susceptibilities, countermeasures, and a residual risk for each programmatic component that needs security protections, and providing reports based on timeline phase and specific acquisition program reporting requirements. The instructions may further include providing an observable notebook to identify, track, and manage operational security issues throughout an acquisition lifecycle and providing a toolkit administrative module to manage user accounts and toolkit configuration. The instructions also include enabling the inclusion of future modules that may be developed at a later date.

DESCRIPTION OF THE DRAWINGS

The exemplary embodiments of the apparatus and method for providing program protection engineering, security management, and report preparation for sensitive and classified projects will be described in detail with reference to the following figures, in which like numerals refer to like elements, and wherein:

FIG. 5B illustrates an exemplary program information interface;

FIG. 8B illustrates an exemplary system programmatics interface;

FIGS. 9E-9G illustrate exemplary processes in assessing criticality, assessing vulnerability, assessing countermeasure effectiveness, and assessing residual risk in the questionnaire module;

FIG. 9H shows an exemplary 5×5 Assessment Matrix used in the questionnaire module;

FIGS. 10B-10C illustrate exemplary report interfaces of the report module;

FIG. 10D shows an exemplary equation used to represent the overall program risk is computed in the report module;

FIG. 12B illustrates an exemplary toolkit administrative interface; and

DETAILED DESCRIPTION

An apparatus and method use a program protection engineering (P2E) toolkit to provide program protection engineering, security management, and report preparation for sensitive and classified projects. The P2E toolkit is a software implementation of security policies, procedures, and methodologies associated with large-scale system acquisition programs within, for example, the classified government community. Specifically, the P2E toolkit is a set of integrated tools automating and streamlining the Integrated System Security (ISS) and protection planning processes used by government organizations, corporations, and individuals involved in the acquisition of sensitive or classified systems to include lifecycle protection. One skilled in the art will recognize that the methodology and processes used in the P2E toolkit are applicable to corporate programs where proprietary, intellectual property, or legal liability issues are of concern.

The P2E toolkit provides end-to-end program protection engineering, security management, and report preparation for sensitive and classified programs throughout the program lifecycle, and assists security professionals and program managers to make appropriate decisions to protect their acquisition programs from compromise due to foreign intelligence threats or corporate/industrial espionage.

Figure 1:
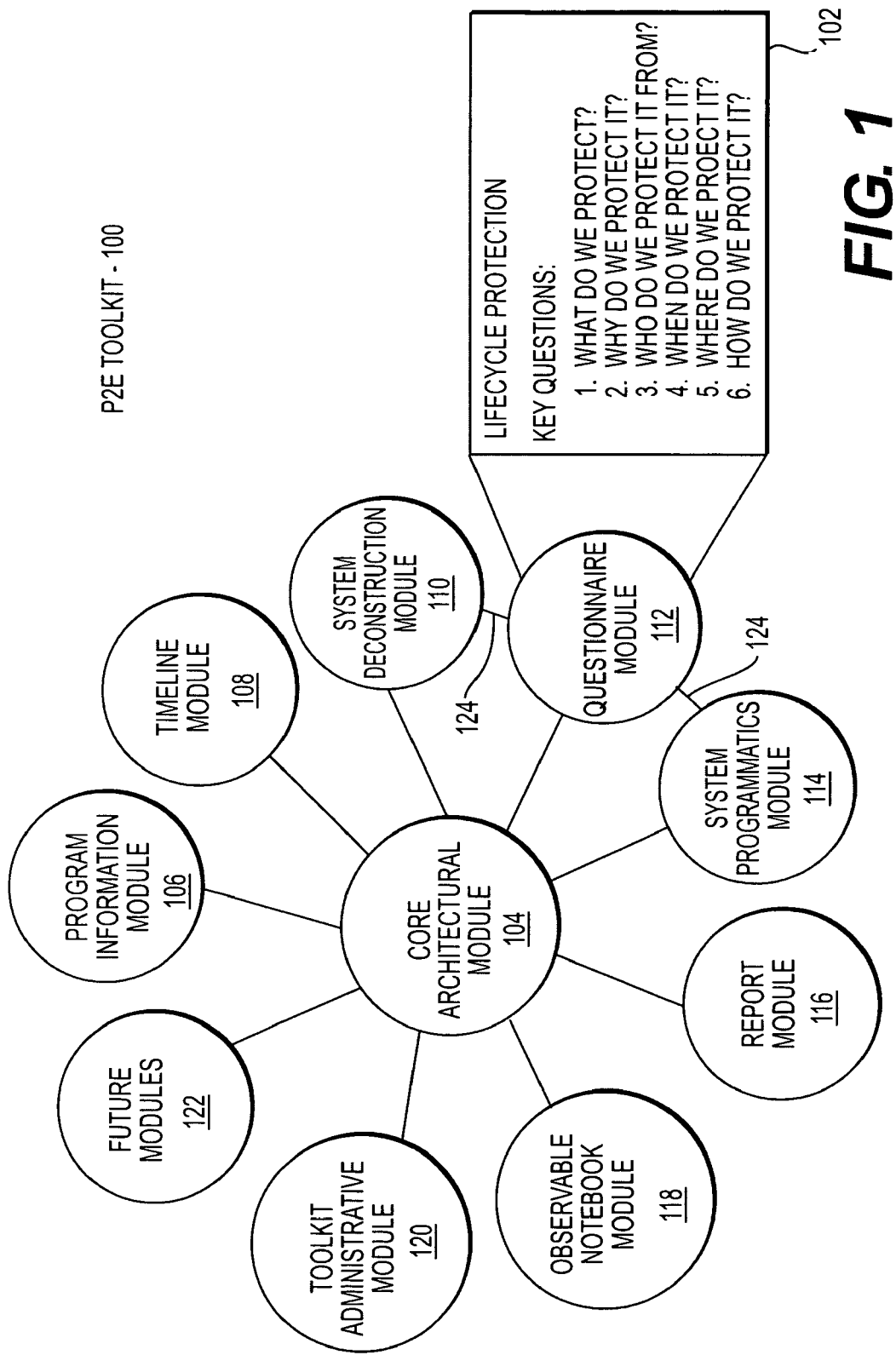
FIG. 1 illustrates an exemplary program protection engineering (P2E) toolkit.

FIG. 1 illustrates an exemplary P2E toolkit 100. The exemplary P2E toolkit 100 may be a web-based application and may be a collection of integrated modules designed to manage security requirements during the lifecycle of an acquisition program. Referring to FIG. 1, lifecycle protection revolves around six key questions 102. These questions are asked continuously during each phase of the acquisition lifecycle. The remainder of FIG. 1 is an example of the P2E toolkit implementation. A core architectural module 104 provides common functions and utilities used by all of the other modules in the P2E toolkit 100, each performing a specialized function. These semi-independent modules may include a program information module 106, a timeline module 108, a system deconstruction module 110, a questionnaire module 112, a system programmatics module 114, a report module 116, an observable notebook module 118, a toolkit administrative module 120, and may be extensible to accommodate future modules 122. The toolkit may have primary links 124 connecting the questionnaire module with both the system deconstruction 110 and system programmatics 114 modules. Secondary links between the questionnaire module 112 and other modules in the P2E toolkit may be through the core architectural module 104.

The core architectural module 104 may provide internal navigational controls, standard style sheets, and standard color palettes, database connectivity, text string functions, date functions, encryption and decryption algorithms, user permission functions, hidden data value transfer functions, window functions, table handling functions, floating menu handling functions, combo box and list box functions, frame functions, menu functions, image functions, document and report functions, sorting functions, and password validation functions.

With continued reference to FIG. 1, the program information module 106 may provide basic information about the program such as its mission, key personnel, and mission partners. This module provides high level information descriptive of the acquisition program.

The timeline module 108 may provide graphical display of timeline charts, milestones, and protection activities, and may provide specification of start, end, and completion dates for milestones and protection activities. Dependencies between related milestones and protection activities may be supported. Changes in dates would be "rippled" through all dependent milestones and protection activities. All protection activities may be linked to other modules in the toolkit.

The ability to add multiple timelines associated with the insertion of new technologies during the lifecycle may be supported. Many acquisition programs evolve over time and use a spiral development model where continual improvements are made and incorporated into the acquisition lifecycle. The insertion of new technologies is a result of either a pre-planned process improvement (P3I) initiative where the introduction of new technologies was foreseen; a pure technology insertion where a new discovery or idea is added to the system; or in response to a threat such as enhanced capabilities of an adversary to counter the system. Regardless of the reason for inserting new technologies, the time module may support management of multiple timelines for the same acquisition program with each timeline associated with the new technology. The timeline module 108 may also provide notification of overdue milestones and protection activities. Analysts may modify the acquisition model to make adjustments as needed, such as adding and removing milestones or protection activities.

The system deconstruction module 110 breaks down the hardware components and identifies those items that are critical to the success of the program. The system deconstruction module 110 may provide a breakdown tree structure for identification of critical program elements. These elements may be related to national security for classified government systems or company proprietary information for corporations. The system deconstruction module 110 may also provide questionnaires for each node in the breakdown tree structure to help determine whether the node is indeed a critical element and if so, its degree of criticality.

The questionnaire module 112 may present numerous questionnaires using a Turbo Tax™ type of format, for example. The questionnaire module 112 may contain a ruleset to determine the order for presenting the questions. Questionnaire question types may include, for example, system programmatics, criticality assessment, Gray Zone issues, eligibility determination, classification level determination, sensitive compartmented information (SCI) determination, identification of countermeasures, costs, and assessment of residual risks questions.

The system programmatics module 114 may provide support for some of the non-technical aspects of the program acquisition, such as budget, contractor relationships, performance metrics, testing methods and plans, training, and maintenance.

The report module 116 may support reports of the traditional paragraph layout and reports that have a tabular style. The report structure initially may be determined by master template and may be configurable to accommodate specific customer requirements. The report module 116 may also generate a rich text format (rtf) formatted file compatible with Microsoft Word, and may generate an extensible markup language (XML) formatted file for security classification guides (SCG) compatible with Northrop Grumman—TASC's Portion Marking and Verification Tool™ (PMVT).

The observable notebook module 118 may assist in identifying and monitoring operational security observables throughout the acquisition lifecycle. The toolkit administrative module 120 may provide login and password control, may create a new program, may open an existing program, and may manage various aspects of the P2E toolkit 100. These modules will be described in more detail with respect to FIGS. 3-12.

The future modules 122 may serve as a placeholder for new features of the system. Future modules may be quickly designed and integrated into the P2E toolkit 100 if they conform to the basic architectural model. Examples of future modules include Cost Analysis Modules for both government organizations and corporations, an International Traffic in Arms Regulation (ITAR) Module for government systems, and intellectual property and legal liability modules for the corporate acquisitions.

Figure 2:
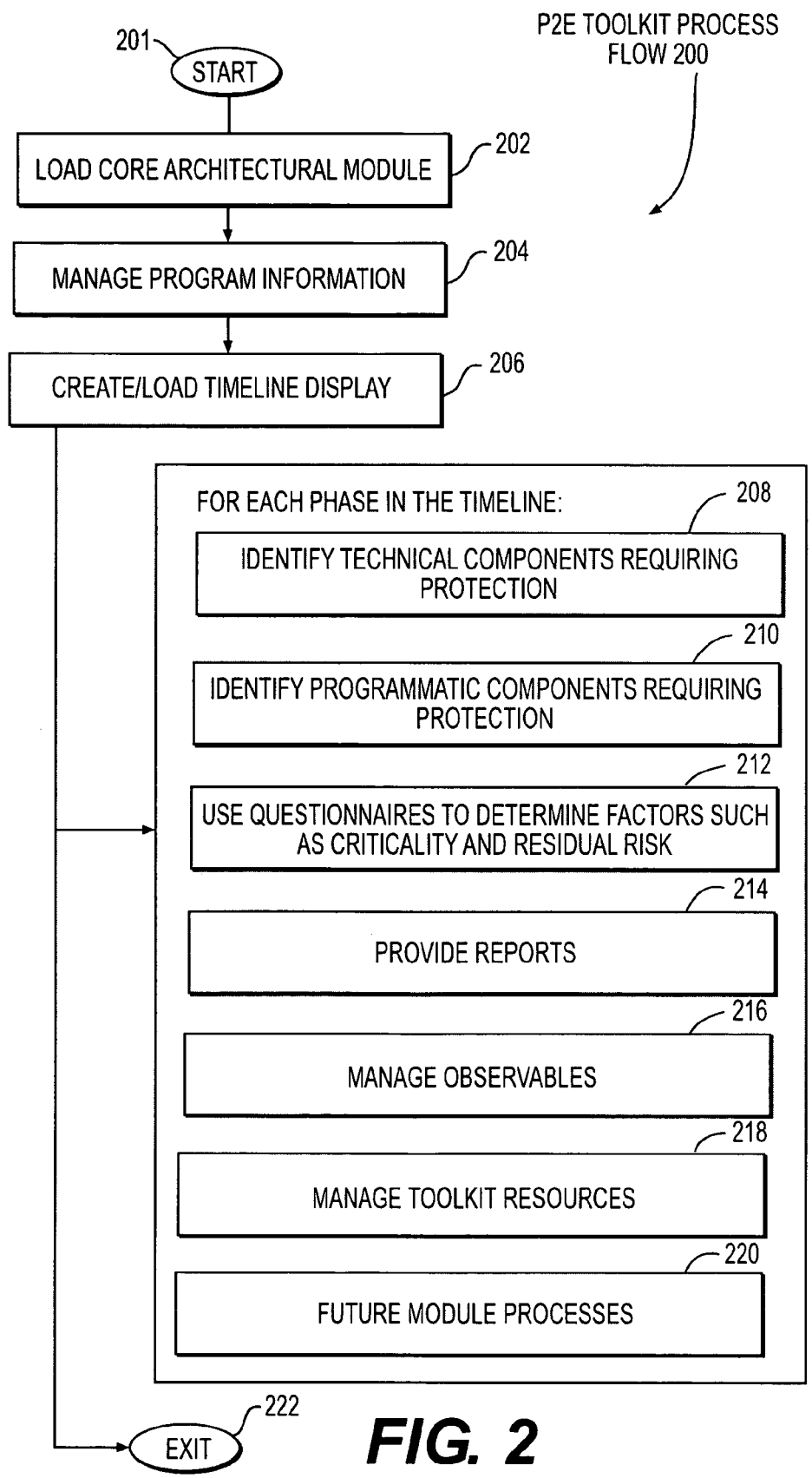
FIG. 2 is a flow chart illustrating the basic approach and methodology of the P2E toolkit.

FIG. 2 is a flow chart illustrating an exemplary method 200 for providing program protection engineering, security management, and report preparation for sensitive and classified projects. The method 200 begins (block 201) by enabling the user to start the P2E toolkit 100. After the user starts the P2E toolkit, the core architectural module 104 is loaded (block 202). The method 200 further enables the user to manage the program information module 106 by creating or specifying an acquisition program using the program information module 106 (block 204). This module manages basic information about the acquisition program and sets up timeline and report information for the program by copying default variables from a master database to a program specific database. A timeline module 108 provides and displays a timeline of the specified acquisition program (block 206). The timeline represents the entire lifecycle—inception to end of life—for the acquisition program. The lifecycle protection project management activities consist of performing various tasks for all phases in the timeline. The system deconstruction module 110 allows the analyst to identify the technical components that need security protections (block 208). The system programmatics module 114 identifies the programmatic components that need security protections (block 210). The questionnaire module 112 presents questions to determine factors such as criticality, vulnerabilities, threats, susceptibilities, countermeasures, and the residual risk for each technical component and each programmatic component that needs security protections (block 212). The report module 116 provides reports required by the selected acquisition program (block 214). The observable notebook module 118 is used to monitor and manage operational security issues throughout the lifecycle (block 216). As the lifecycle progresses, the toolkit administrative module 120 is used to manage toolkit resources, including making necessary adjustments to the P2E toolkit (block 218). Finally, as future modules 122 are designed and integrated into the P2E toolkit, their capabilities are applied to the acquisition program (block 220).

Figure 3A:
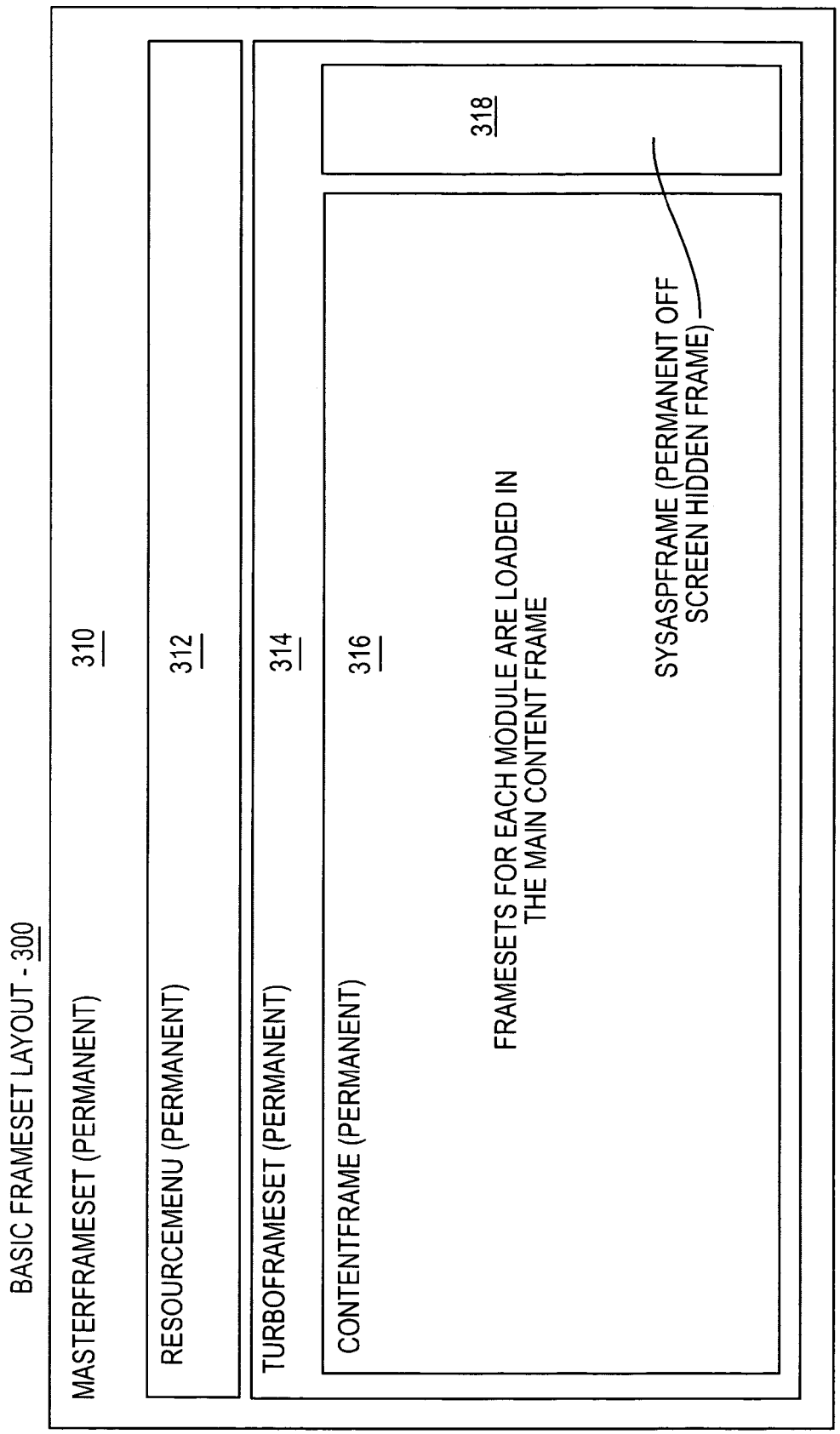
FIG. 3A illustrates an exemplary basic frameset layout created by the core architectural module of the P2E toolkit.

The P2E toolkit 100 may use frames and framesets which are common software programming constructs for web-based applications. FIG. 3A illustrates an exemplary basic frameset layout 300 created by the core architectural module 104. Some frames are on-screen and visible, such as a master frameset frame 310, a resource menu frame 312, a turbo frameset frame 314, and a content frame 316. An off-screen frame (i.e., hidden frame) 318, such as SysAspFrame, may be used for data processing and database transfers. The resource menu frame 312 may be visible as a banner at the top of the display. The content frame 316 may occupy the visible area below the banner and may be initially loaded with a welcome message. All of the frames in the core architectural module 104 may be permanent and remain throughout the operation of the P2E toolkit 100. The other modules may be loaded into the content frame 316 when they are requested by the user. The resource menu frame 312 may be loaded with, for example, four dropdown menus: Administration, Phases, Tools, and Help.

Figure 3B:
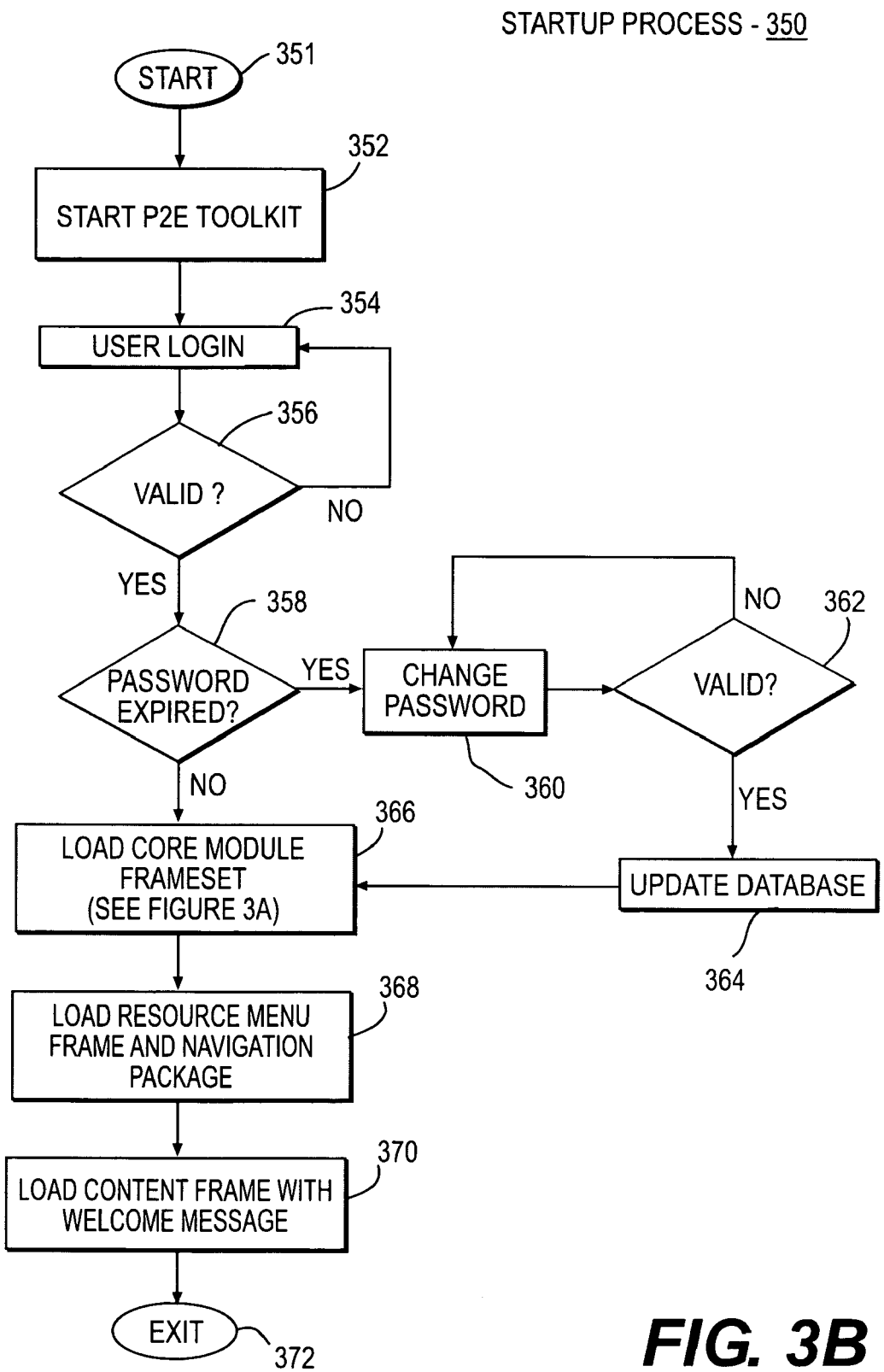
FIG. 3B is a flow chart illustrating an exemplary startup process of the core architectural module in the P2E toolkit.

FIG. 3B is a flow chart illustrating an exemplary startup process 350 of the P2E toolkit 100. The process 350 may start (block 351) the P2E toolkit 100 by, for example, accessing the index.htm page in the P2E toolkit 100 root folder (block 352). This file may immediately call another file in a login folder that sets up the login framesets and loads a login panel requesting a login name and password. An analyst, i.e., user, logs in (block 354). A check login file, such as checkLogin.asp, may verify that the user is authorized to use the application (block 356) and whether their password has expired (block 358). If the user identification is not valid (block 356), the process 350 goes back to block 354. If the password has expired (block 358), the user is asked to change the password before proceeding (block 360). Password change may be performed by a password change file and a password check file, such as, pwdChange.asp and pwdCheck.asp. The password change file ensures that new passwords conform to the rules governing passwords. If the password is not valid (block 362), the process 350 goes back to block 360. Once a valid login is completed the login portion is finished. The P2E toolkit 100 may then update the program database (block 364) and may load the core architectural module frameset as shown in FIG. 3A (block 366).

This initial set up is important to the operation of the P2E toolkit 100. The core architectural module frameset may remain as long as the P2E toolkit is active. For example, referring to FIG. 3B, the process 350 may load the resource menu and navigational functions (block 368) into the ResourceMenu frame 312 and may load a welcome message (block 370) into the content frame 316.

The navigational functions may be contained in a navigation file, such as navigation.js. The structure of the navigation file may facilitate development and integration of modules into the P2E toolkit 100. Two functions may be written for each module. One may be a setup function that loads the frameset for the module. The other may be a startup function that initializes the parameters the module needs. New modules may be incorporated by adding these two functions to the navigation file. Since the navigation file is loaded into one of the permanent frames, users may have access to all modules. The navigation file may also have a large case statement that uses an index to route control of the program to the appropriate module setup function. Each item in the Tools, Administration, and Help menus may have a unique index, which is the index used in the case statement.

The P2E toolkit 100 may include a program database that contains information for building the menus. For example, the items to appear in the menu and their associated index may be stored in the program database. A user menu file, such as userMenu.asp, may retrieve this data to build the menus. When an analyst selects a menu item, the index may be passed to the case statement and the selected module may be loaded into the content frame 316.

Adding new modules into the P2E toolkit 100 may include creating setup and startup functions in the navigation file, adding a section for the module in the case statement, and updating the program database specifying which menu the module goes in and specifying its index. The software code for the module may be stored in its own folder on a local computer or server.

Another key element may be the use of hidden fields for passing data between and within modules. Data is typically passed between web-pages using a parameter string in the uniform resource locators (URL). The amount of data passed this way is limited to 255 characters. For the P2E toolkit 100, a hidden values file, such as hiddenValues.inc. may contain input type fields that are not visible on the screen. These fields may be used to transfer data between the web-pages that make up a module and between modules (e.g., between the core architectural module and the other modules). For example, the identification number for the acquisition program or the name of the analyst are needed by all modules. These values may be transferred through hidden fields.

Similar to the navigational functions, the hidden values file may be loaded into the resource menu frame 312 to render the values available to all modules. The hidden values file may also be included in virtually all of the web-page files ensuring data specific to a module is passed from one page to the next.

Figure 4:
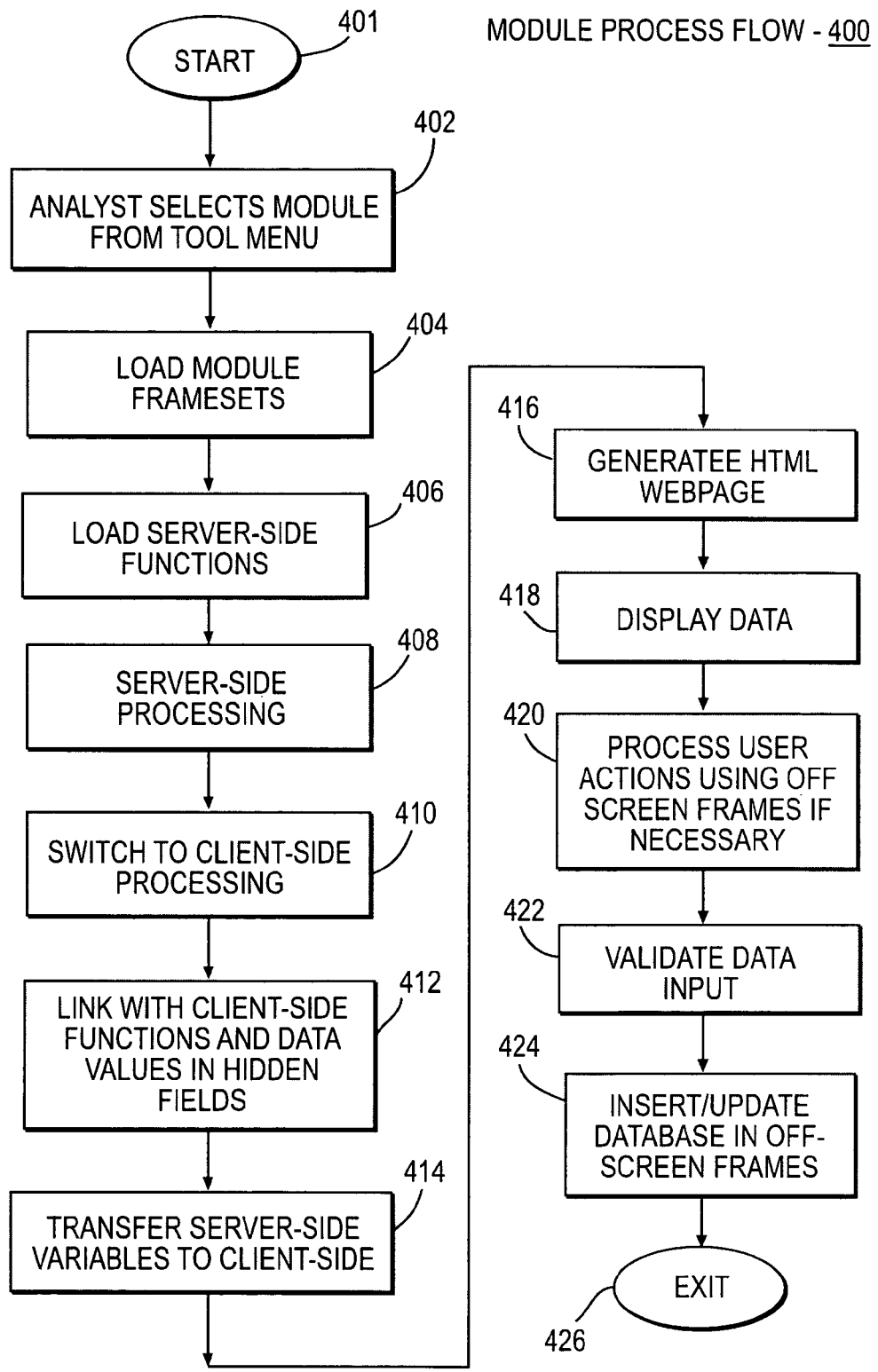
FIG. 4 illustrates an exemplary process flow for each module shown in FIG. 1.

FIG. 4 illustrates an exemplary process flow 400 for each module shown in FIG. 1. Each module in the P2E toolkit 100 may be independent with its own set of web-page files and may follow the same exemplary process flow 400. When an analyst, i.e., user, selects a module from a Tools menu (block 402), the common navigational functions in the P2E toolkit 100 may load the module framesets into the main content frame 316 and then may call web-page file that sets up all the module parameters (block 404). Virtually every file within a module may follow the same process.

Next, the process 400 loads server-side functions (block 406). Server-side functions may be linked using, for example, #include statements. The process 400 performs required server-side data processing, such as defining variables and generating datasets containing information retrieved from the program database, i.e., master database (block 408). Any calculations, data processing, or data validation tasks may be performed on the server-side. The process 400 then transitions to the client-side processing (block 410) where style sheets, common functions, utilities, hidden field values, and any navigational functions may be defined using, for example, href links or script tags (block 412). The process 400 further transfers the variables that are defined on the server-side to the client-side (block 414).

The process 400 then generates the hyper-text markup language (HTML) web-page (block 416), which is displayed to the analyst (block 418). As the analyst enters data and makes selections, the P2E toolkit 100 may process the data and selections using the off screen frames 318 (block 420). The data processing may be performed using client-side functions. Some of the data processing may be performed by executing another web-page file, for example, in one of the off-screen frames (block 420). The process 400 then validates data input (block 422) and updates the program database in the off-screen frames 318 (block 424). The module may be removed when another module is requested. The process 400 exits (block 426).

Figure 5A:
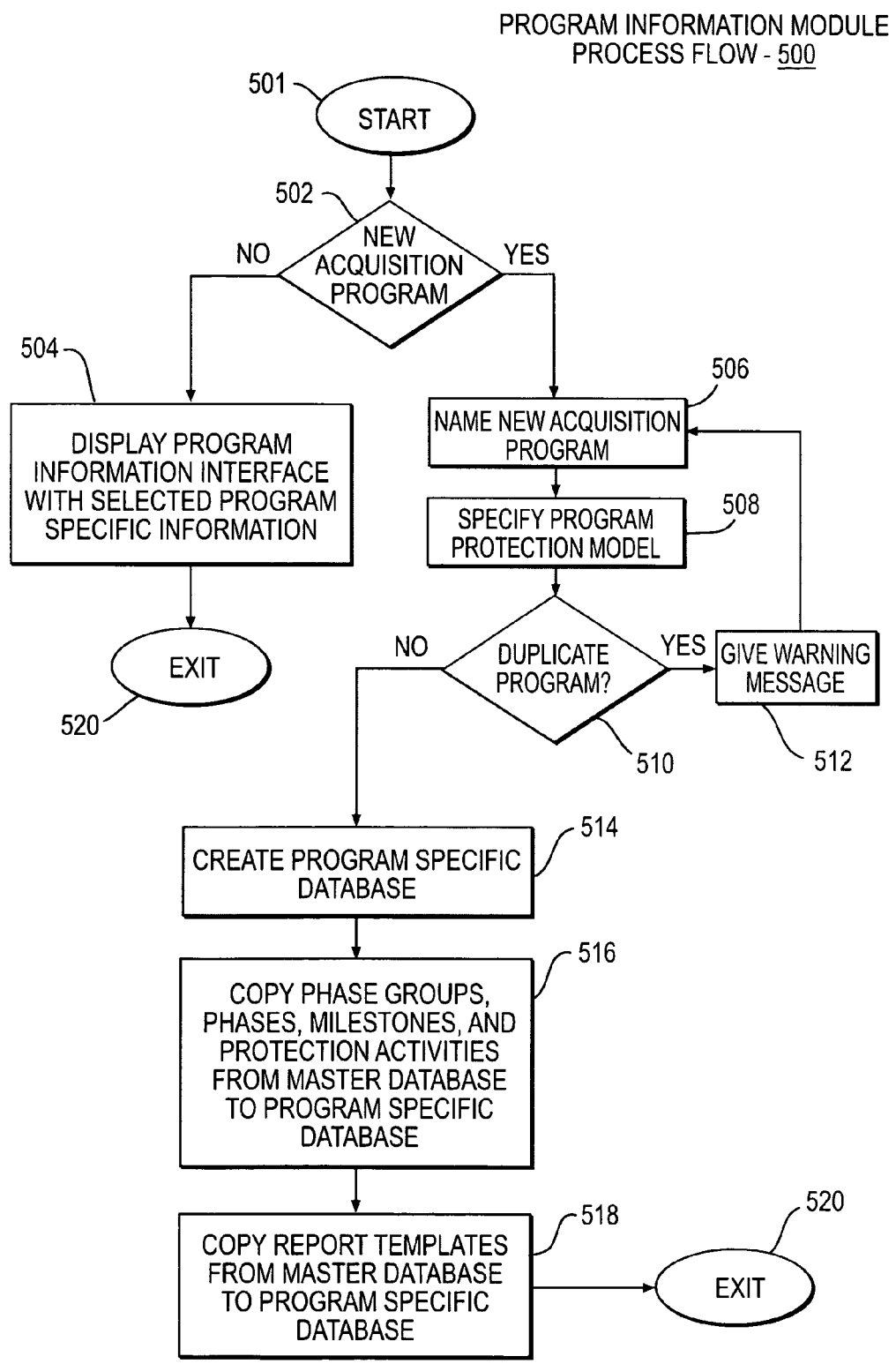
FIG. 5A is a flow chart illustrating an exemplary process for the program information module in the P2E toolkit.
Figure 5B:
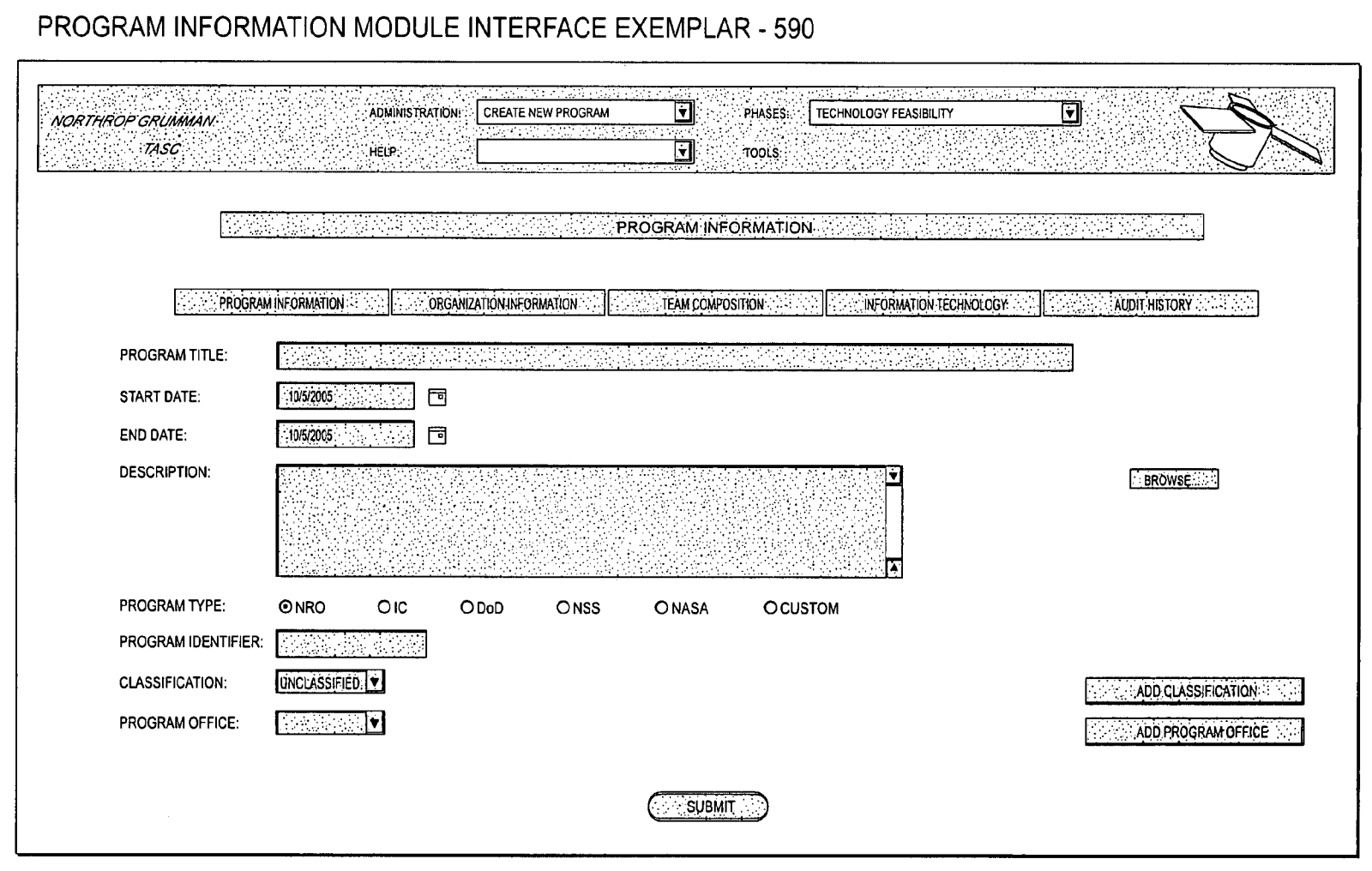

FIG. 5A is a flow chart illustrating an exemplary process 500 for the program information module 106. FIG. 5B is an exemplary program information module interface 590. This figure shows several options for the program type. For government organizations, each organization typically has its own acquisition process. Components of these models are typically mandated by Executive Order, Federal Statute, the Federal Acquisition Requirements (FAR), or specific organizational requirements. As examples, the Department of Defense (DOD) uses the Defense Acquisition Guidebook (DAG) and the DoDD 5000 Series of Policy Directives; the National Reconnaissance Office uses NRO 82-2b.

The acquisition of systems, equipment (e.g., aircraft, ship, satellite), software programs, or corporate proprietary products (medicines, perfumes, etc.) requires time and resources. Associated with the project are numerous planning activities and milestones. Although the processes are very similar at a macro level, each organization has its own timeline structure with a unique set of milestones and protection activities. The P2E toolkit 100 may use the timeline module 108 to specify the entire acquisition schedule. The timeline module 108 may load data supporting the acquisition timeline for a selected acquisition model. The timeline module 108 may be one of the first modules that an analyst uses.

The acquisition timeline may be divided into phase groups that may further be divided into phases. A set of milestones and protection activities may be associated with each phase. The number of phase groups, phases, milestones, and protection activities, as well as their names may vary from model to model.

The P2E toolkit 100 may support acquisition models for, for example, Intelligence Community, DOD, National Security Space, and the National Reconnaissance Office. However, one skilled in the art will appreciate that the P2E toolkit 100 can modified through the toolkit administrative module 120 to support other types of acquisition models including those that are corporate specific.

With continued reference to FIG. 5A, analysts can either created a new acquisition program or select from a list of existing programs (block 502). If the analyst selects an existing program, the P2E toolkit may display the program information module with information for the selected program filled in (block 504). When a new acquisition program is created, the analyst may be prompted to name the program (block 506) and select a specific acquisition model (block 508). After verifying that the new program name is not duplicated (blocks 510, 512), a program specific or working database for may be created (block 514). Then phase groups, phases, milestones, and protection activities for that model may be copied from the master database to a working database, i.e., program specific database, for the acquisition program (block 516). The report structure templates for the selected model are also copied from the master database to the working database (block 518).

Figure 6A:
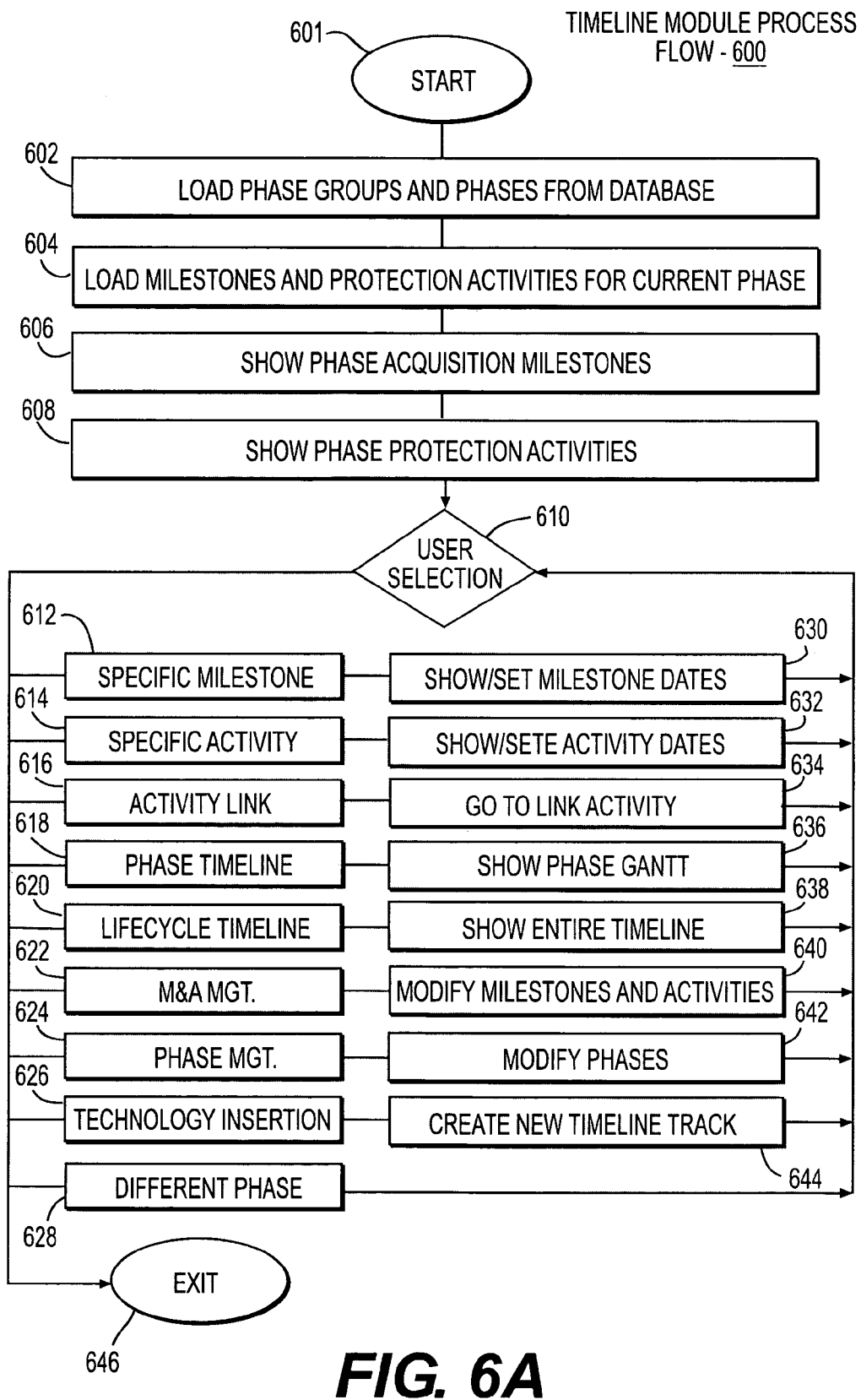
FIG. 6A is a flow chart illustrating an exemplary process of the timeline module of the P2E toolkit.
Figure 6B:
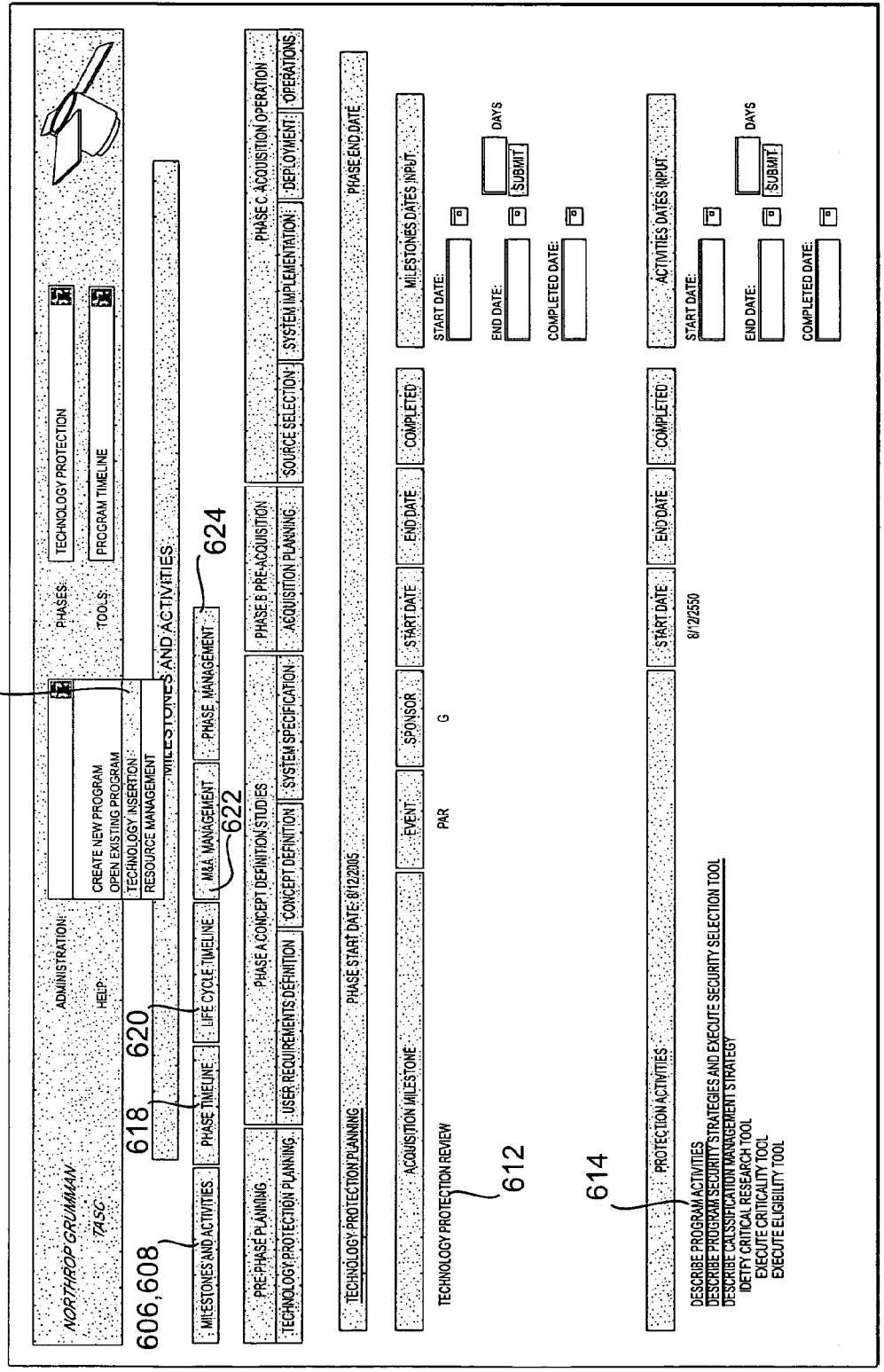
FIG. 6B illustrates an exemplary timeline interface.

When an analyst selects the timeline module 108 from the Tools menu the process loads the timeline interface into the main content frame 316. FIG. 6A is a flow chart illustrating an exemplary process 600 of the timeline module 108 and FIG. 6B illustrates an exemplary timeline interface 690. The process 600 starts (block 601) by loading phase groups and phases from the working database (block 602). The process 600 further loads milestone and protection activities for the phase the analyst is working on. This is the first phase for a newly created program (block 604). The exemplary timeline interface 690 may be used to display the acquisition timeline.

As different phases are selected, the milestones and protection activities for that phase may be displayed (blocks 606, 608).

Referring to FIGS. 6A and 6B, the exemplary timeline interface 690 is interactive and allows the analyst to make various selections (block 610), including selecting a specific milestone 612 or a specific protection activity 614 and specifying start, end, and completion dates (blocks 630, 632). Calendar icons may be used to invoke a calendaring function used to set or edit the dates. The entire schedule may be specified using the timeline interface 690.

All of the protection activities may be linked to some other component within the P2E toolkit 100. Selecting one of these activity links 616 may exit the timeline module 108 and may load another module (block 634), such as the system deconstruction module 110. Alternatively, selecting an activity link 616 may show a popup window containing the appropriate information, such as program descriptions.

With continued reference to FIGS. 6A and 6B, the exemplary timeline interface 690 may include menu options for phase timeline 618 and lifecycle timeline 620. Both of these selections may display the timeline in a graphical GANTT chart (blocks 636, 638). The phase timeline 618 shows the phase milestones and activities, whereas the lifecycle timeline 620 shows a timeline for all of the phases in the model with a single line for each phase.

The exemplary timeline interface 690 also includes menu options 622, 624 for managing phases and managing milestones and protection activities. These options may display information allowing the analyst to adjust the timeline model 108 for the specific program the analyst is working on. Milestones and protection activities may be added, deleted, and reordered if needed (block 640). In the phase management section 624, the analyst may modify the phases (block 642), such as managing the names, color, and order of the phase, and whether the phase group or phase is visible on the main display.

In the event that new technologies are introduced into the acquisition process, the timeline module may support a technology insertion capability (block 626). This function may present a listing of the phases in the acquisition model. The analyst selects the one where the technology is being inserted. The timeline module then creates another timeline track for managing the new technology (block 644).

If a different phase name is selected (block 628), process 600 goes to block 606, where milestone and protection activity information for the selected phase may be read from the working database and the current phase data may be replaced with that of the selected phase.

Acquisition programs typically include two major components: technical (i.e., hardware and software) and programmatic (i.e., operations). The system deconstruction module 110 may break down the technical aspects into their constituent components. The system programmatics module 114 may analyze the operational aspects of the program, such as goals, objectives, performance measures, and contractor/supplier relationships. One of the primary goals of the P2E toolkit 100 is to identify all the components, i.e., elements, that are critical to the acquisition program's success. The P2E toolkit 100 may identify these critical components, i.e., critical elements, such as critical program information (CPI), critical system resources (CSR), and critical research technologies (CRT), by presenting a series of questions to the user.

Figure 7A:
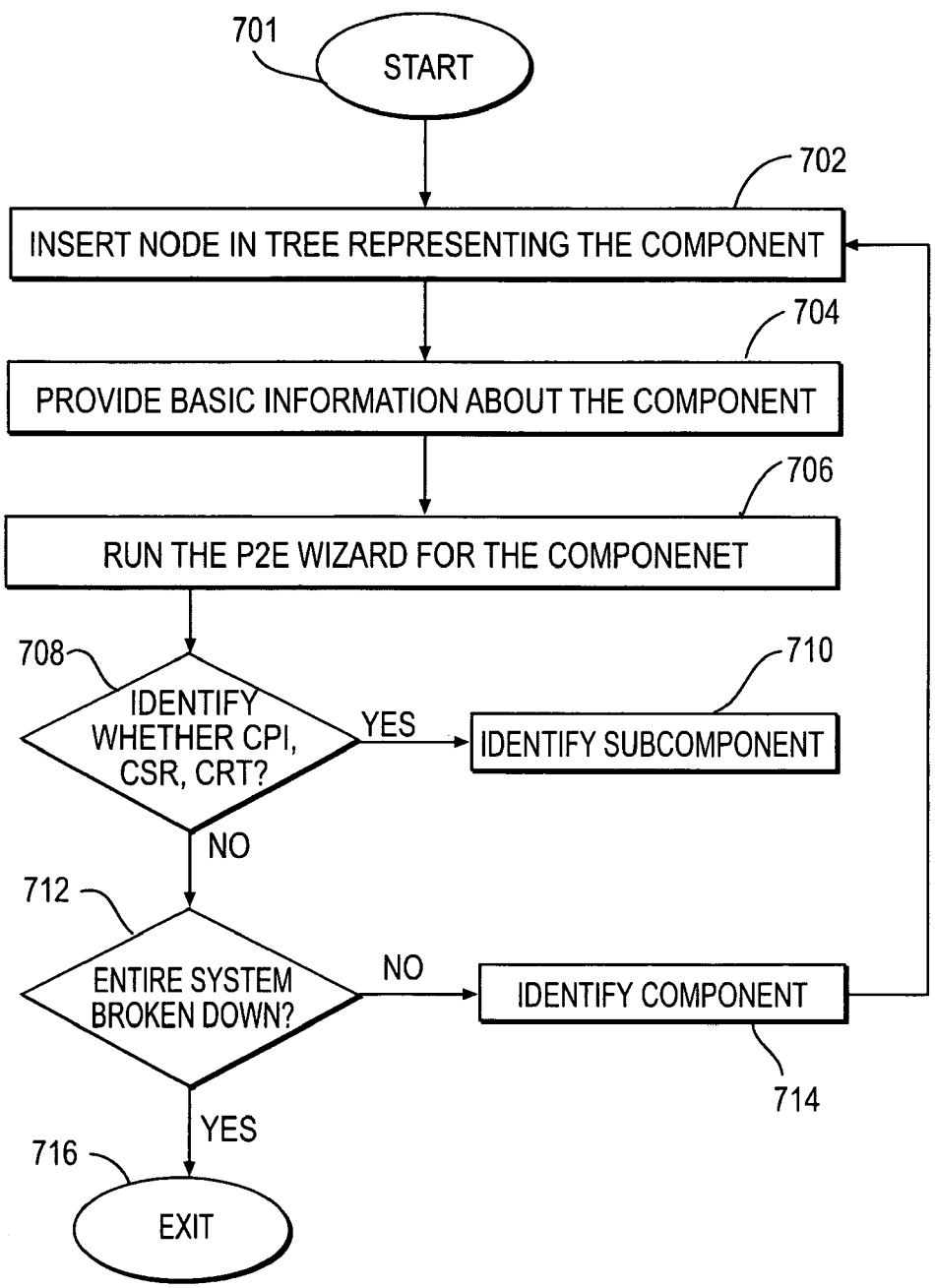
FIG. 7A is a flow chart illustrating an exemplary process of deconstructing the hardware components of a system using the system deconstruction module of the P2E toolkit.

FIG. 7A is a flow chart illustrating an exemplary process 700 of the system deconstruction module 110. As noted above, the system deconstruction module 110 provides the break down of hardware or software aspects of the acquisition program. If the acquisition is for a satellite system, for example, the system deconstruction module 110 may enable analysts to start at the most general level and deconstruct the entire system down to its constituent piece parts. The purpose of this deconstruction is to break down each component and identify those components that are the most critical from a security perspective and require some form of security protection. For hardware systems, the critical component may be a specific device or material. For a software system, the critical component may be a processing algorithm.

The deconstruction may be represented as a tree structure that begins with a root node representing the name of the program. The process 700 starts (block 701) by enabling the analyst to insert nodes under the root node representing largest components of the system (block 702). The analyst typically works in conjunction with system engineers and subject matter experts. Each of these components may be further broken down into subcomponents.

For each node inserted into the tree, basic information is requested to identify the component such as its name and description (block 704). Once the information for the component is saved in the working database, a unique identification number may be assigned and used to track that component throughout the entire process of the P2E toolkit 100.

To determine whether the component is "critical" and whether the component requires some form of security protection, a "P2E Wizard" may be used (block 706). The P2E Wizard is part of the questionnaire module 112 and may lead the analyst through a series of questions designed to identify CPI, CSR, or CRT (block 708). If a component is identified as "critical" it must be further broken down into subcomponents until the specific item requiring protective measures is isolated (block 710). The P2E Wizard is discussed in more detail later.

Identifying these critical components is important since they have a direct impact on the success or failure of a particular program or mission. Disclosure of the critical components of a system to an adversary may enable them to defeat or render the system useless or unprofitable. These are the components that require security measures and program protection. Since not all components require program protection or security engineering measures, the goal of the system deconstruction module 110 is to identify all of the essential components of a program that do require protection planning and security engineering. The component breakdown process exits (block 716) when the entire system is broken down (block 712) and all of the critical components of the system have been identified (block 714).

The system deconstruction module 110 may support a comprehensive breakdown of an acquisition program. Nodes can be added, deleted, and repositioned in the tree structure. Entire branches can be copied and pasted if needed.

Figure 7B:
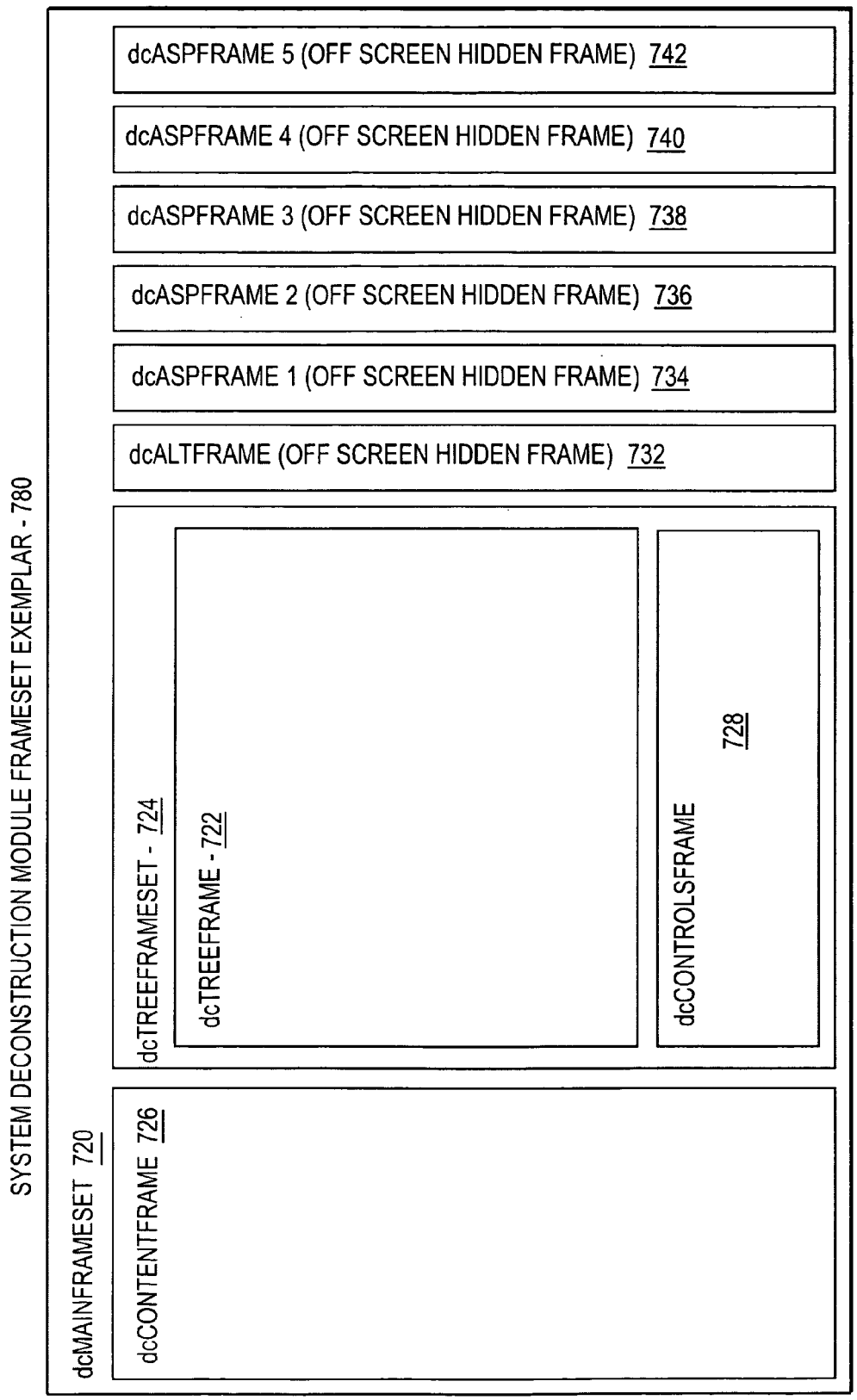
FIG. 7B shows an exemplary frameset of the system deconstruction module of the P2E toolkit.

FIG. 7B shows an exemplary frameset 780 of the system deconstruction module 110. All of the frames in FIG. 7B may be loaded into the content frame 316 shown in FIG. 3A. These frames may remain active until another module is selected by the analyst. For example, the dcContentFrame 726 may manage the Component or Part Information, the dcTreeFrame 722 may handle the System Deconstruction Tree display, and the dcControlsFrame 728 may display the buttons. The system deconstruction module 110 may use the off-screen frames 732, 734, 736, 738, 740, 742 for data processing and interaction with the master and working databases.

Figure 7C:
FIG. 7C illustrates an exemplary system deconstruction interface.

FIG. 7C illustrates an exemplary system deconstruction interface 790. A P2E Wizard button 792 may lead to a series of questions used to assess sensitive and/or classified information. This P2E Wizard button may be how block 706 is implemented.

Figure 8A:
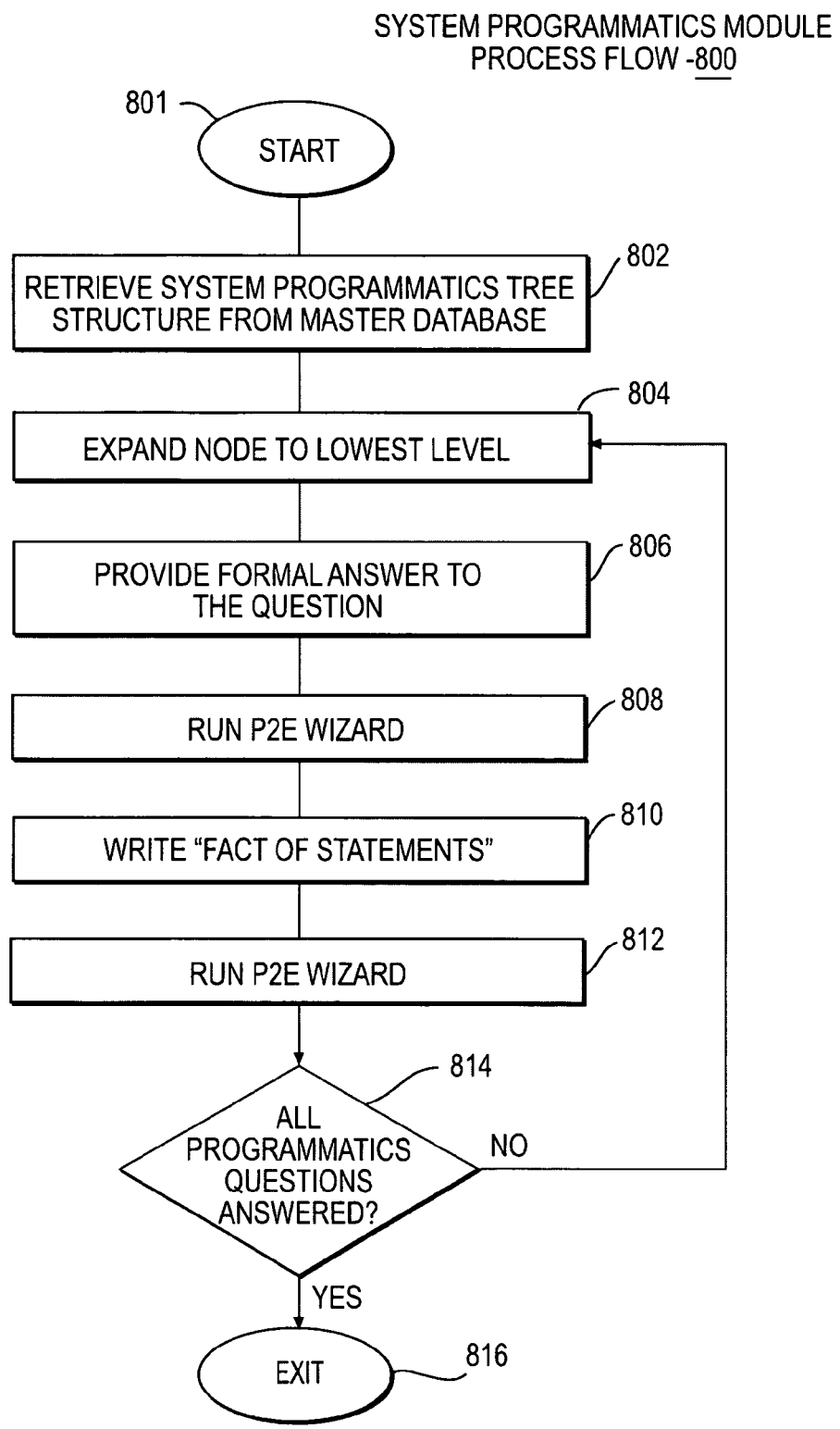
FIG. 8A is a flow chart illustrating an exemplary process of the system programmatics module of the P2E toolkit.

FIG. 8A is a flow chart illustrating an exemplary process 800 of the system programmatics module 114. The system programmatics module 114 is similar to the system deconstruction module 110 except it focuses on the operational aspects of the acquisition program. A standard set of areas may need to be addressed in any system acquisition. The system programmatics module 114 may include, for example, eleven major sections (shown in FIG. 8B). The sections may cover the gambit of concerns, such as budgets, suppliers and their contractual relationships, technical design, and performance metrics. Any of these issues may be classified and/or require some form of program protection.

The system programmatics module 114 may include a large questionnaire. The standard questions may be represented in a tree structure where the nodes of the tree are the system programmatics questions. The process 800 starts (block 801) by retrieving system programmatics tree structure from the master database (block 802) and expanding nodes to the lowest level (block 804). The "leaf nodes" of the tree may be the specific questions that need to be answered. Each question may have a two-part answer. The first part is the formal answer to the question. The second part is referred to as a "Fact of Statement."

Selecting either the formal answer part or the "Fact of Statement" part may initiate the questionnaire module 112. The formal answer part presents the statement of the question, such as "Who is the Prime Contractor?" Once the analyst provides the formal answer (block 806), the P2E Wizard may be started (block 808) to determine whether that answer should require security and program protection measures. The process 800 then uses "Fact of Statement" questions that ask for a listing of facts that can be derived from the formal answer (block 810). These statements are typically related to associations between one or more components, i.e., elements, of the acquisition program. An example may be: "company XYZ is conducting research on technology ABC." These statements may also need to be assessed by the P2E Wizard (block 812) because the statements may be critical to the success for the program. After all programmatics questions are answered (block 814), the process 800 exits (block 816).

Figure 8B:
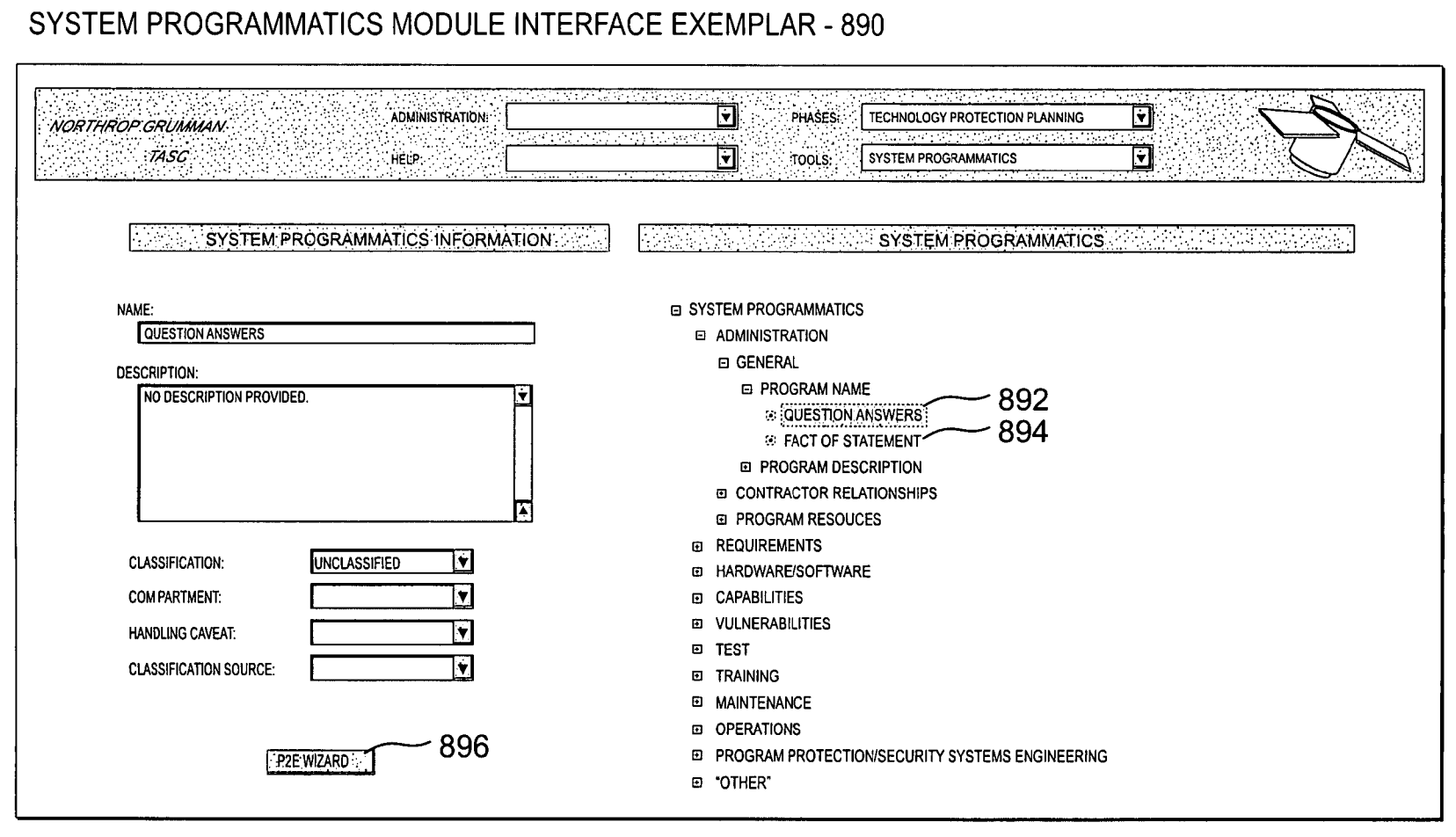

FIG. 8B illustrates an exemplary system programmatics interface 890 with a portion of the Administration node expanded. The system programmatics interface 890 may contain a series of subject areas focusing on the operations and planning aspects of the acquisition. For each of the subject areas, the tree breakdown may conclude with two nodes: Question Answers 892 and Fact Of Statement 894. Selecting these nodes may display a P2E Wizard button 896 on the left.

With continued reference to FIG. 8B, the exemplary system programmatics interface 890 shows eleven exemplary major sections: Administration, Requirements. Hardware/Software, Capabilities, Vulnerabilities, Test, Training, Maintenance, Operations, Program Protection/Systems Security Engineering, and "Other." As shown, each section may further break down into multiple subsections.

Figure 9A:
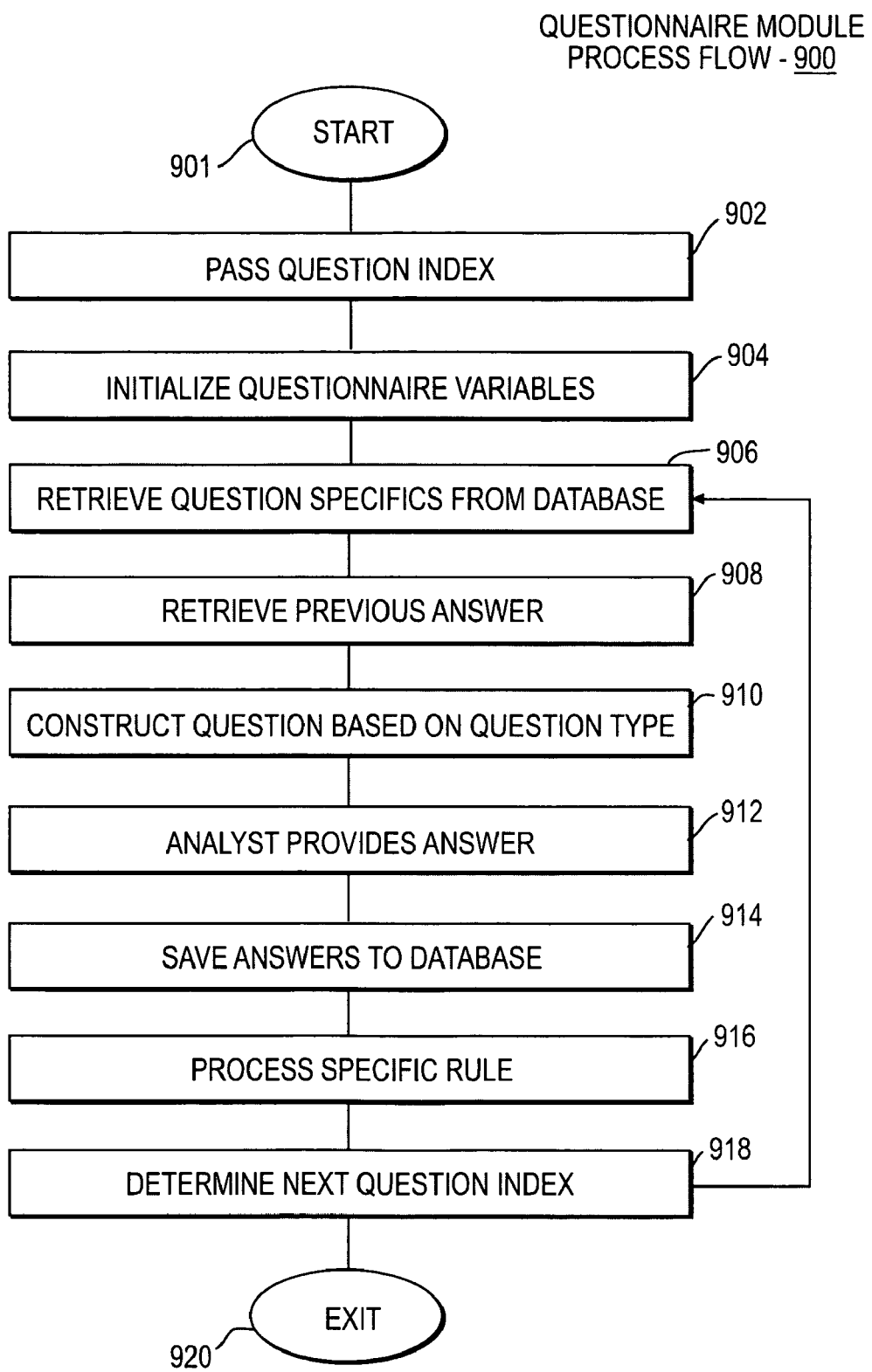
FIG. 9A is a flow chart illustrating an exemplary process of the questionnaire module of the P2E toolkit.

FIG. 9A is a flow chart illustrating an exemplary process 900 of the questionnaire module 112. The questionnaire module 112 manages the presentation of several questionnaires. The questionnaire module 112 may not be directly accessible from any of the menus. The questionnaire module 112 may be linked into the other modules as a data gathering device (block 124 in FIG. 1). When the questionnaire module 112 is called by another module, the process 900 starts (block 901) by passing a question index from the module indicating which specific question is the beginning. For example, a series of questions used to determine whether a technical item is eligible for classification may begin with index 33. As another example, questions focusing on cost may start with index 75. The question statements, the type of question, and how the answers are to be processed may be stored in the master database.

The questionnaire module 112 may be initiated using the same logic as the others. For example, question setup and startup functions, such as fnQcSetup and fnQcStartup functions, in the navigation file may be called. These functions may run an index file, such as qcIndex.asp, that creates the questionnaire framesets. These functions may also run a set startup values file, such as qcSetStartupValues.asp, that initializes questionnaire variables (block 904). Once initialized, a questionnaire file, such as qcQuestionnaire.asp, may be called with the starting question index. The questionnaire file may retrieve all the information about the question (block 906) and any previous answers (block 908) from the program specific database. The information may include a question type indicator, such as single choice, multiple selection, or short answer. Based on the type of question, the questionnaire module 112 may construct the question and may present the question to the analyst (block 910).

When the analyst submits the answer (block 912), a save question file, such as qcSaveQuestion.asp, may retrieve the question information, determine the question type, retrieve the analyst's answer, and save the answer to the working, i.e., program specific database (block 914). The save question file may then load a ruleset file, such as qcRuleSet.asp, to process any specialized rules associated with the question (block 916). Rules may include input verification, consistency checks, or simply determining which question to present next (block 918). The process 900 then goes back to block 906 to process more questions. The process may end whenever a question index of −1 is reached, for example. This may occur at the end of a series of questions or may be set through one of the rules.

The questionnaire module 112 may support the following exemplary question types:
  Short Answer—limited response
  Memo—unlimited response
  Single Choice—select one from a list of options (supports the use of graphics)
  Multiple Select—select all that apply from a list of options
  List of Items—allows the analyst to create a list of items
  List of Components—allows the analyst to create a list of components each of which has a follow-up series of questions and answers
  Rule Generated—a rule assembles answers to previous questions to construct a new question In an exemplary embodiment, the last two question types may create a secondary stream of questions. For example, the List of Components question may contain a list of hardware items. For each of the items in the list there may be a series of questions that need answering, such as cost, supplier, number in the inventory, and physical location.

The questionnaire set of files may track and manage recursive questioning structures where one question creates secondary question sets. The questionnaire module 112 may also manage cases where there is a List of Component type of question within the secondary stream.

Figure 9B:
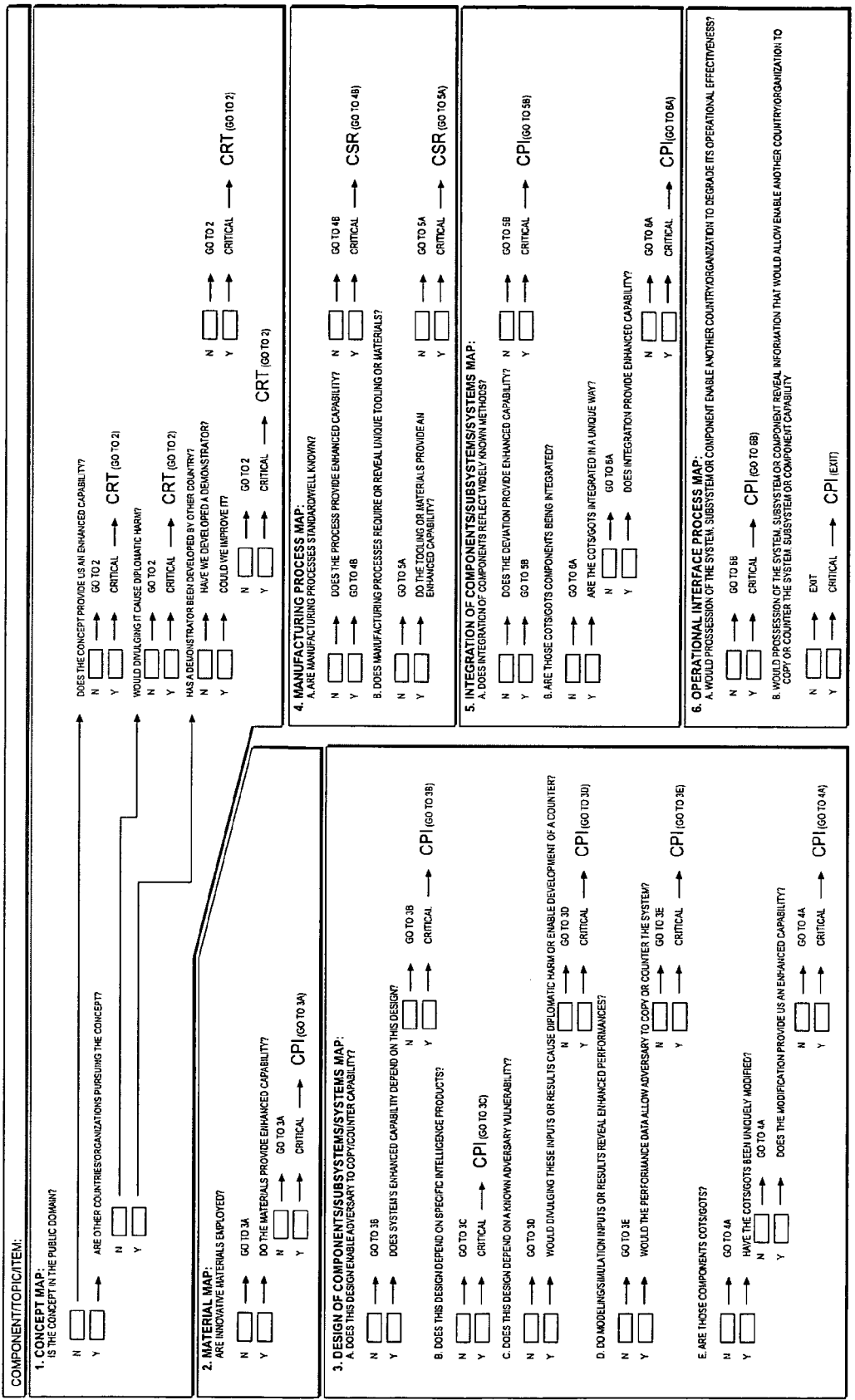
FIG. 9B illustrates a consolidated display of exemplary questions used to determine criticality of program components presented by the questionnaire module of the P2E toolkit.

FIG. 9B illustrates a consolidated display of exemplary questions 930 presented by the questionnaire module 112 to determine, for example, CPI, CSR, or CRT. The questionnaire module 112 may also present the analyst a series of questions targeting specific aspects of the acquisition process.

One of the primary questionnaires in the P2E toolkit 100 is the P2E Wizard, which is a series of questions presented by the questionnaire module 112. Both the system deconstruction module 110 and the system programmatics module 114 may use the P2E Wizard to identify critical elements in the acquisition program. The questions typically focus on several key points:

Is this component CPI, CSR, or CRT?

Is the component eligible for classification?

What is the level of classification—confidential, secret, or top secret?

Does this component require additional Sensitive Compartmented Information (SCI), Special Access Program (SAP), or Special Access Requirements (SAR) protection?

What is the impact of loss and probability of loss associated with this component?

How "critical" is this component to the overall success of the program?

What are the susceptibility, threat, and vulnerability levels for this component?

What are the "signatures" that adversaries might identify to gain information about this component?

What are the appropriate countermeasures that can be employed to minimize foreign intelligence collection activities?

How effective are those countermeasures?

What is the residual risk associated with this component if those countermeasures are implemented?

CPI determination may be the first step in a larger process of determining the residual risk associated with the CPI. The CPI questionnaire typically includes several questions divided into six areas of interest. A number of these questions may specify CPI, CSR, or CRT. Occasionally, a component is so new or unique that answering one of these questions is not clear. If some ambiguity arises in the answer, analysts may select a "No, but may still require protection" option. This selection may lead to a series of questions, referred to as "Gray Zone" questions, which help determine whether the component does indeed require some form of security protection.

Figure 9C:
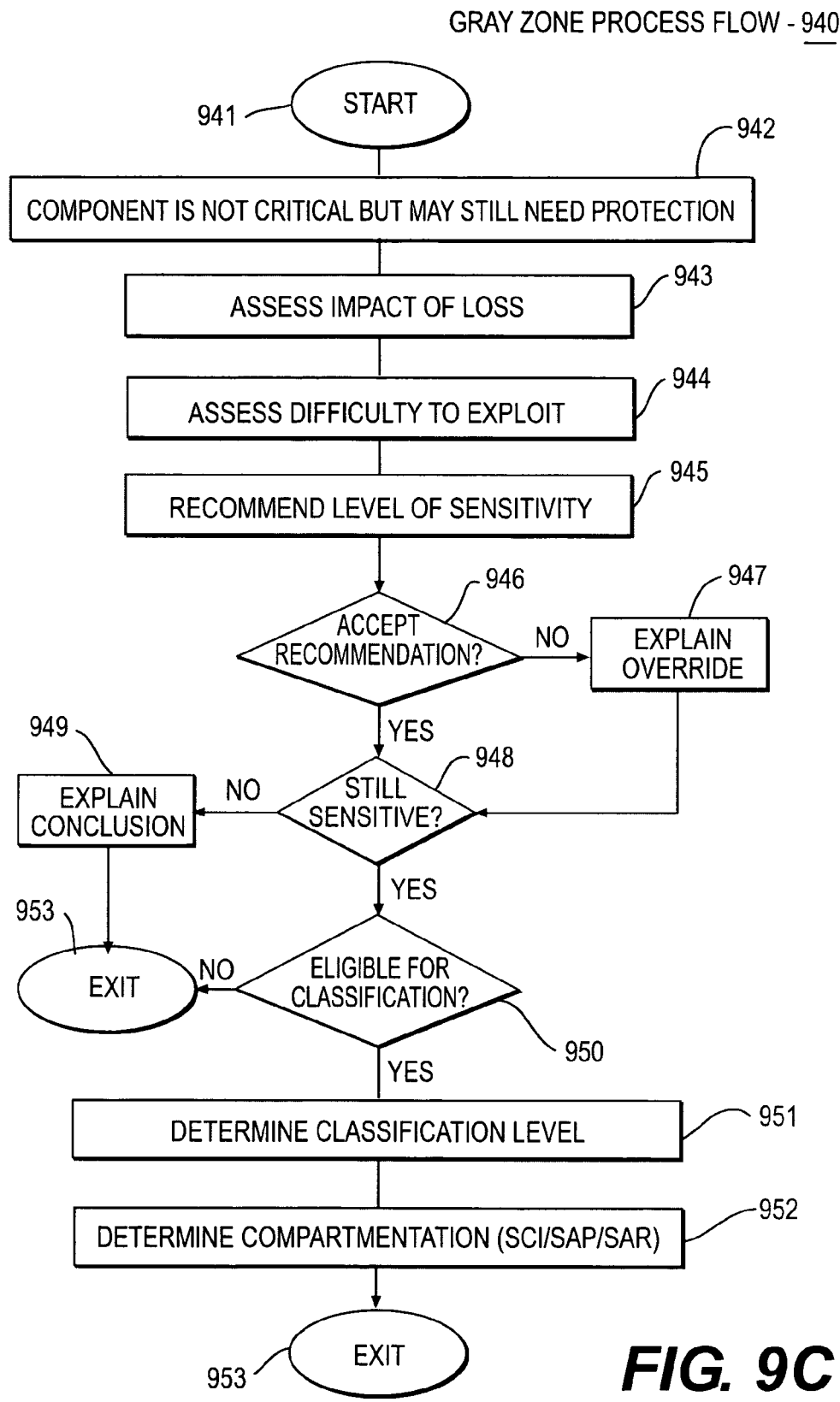
FIG. 9C is a flow chart illustrating an exemplary process in managing Gray Zone questions which are used when a concept is revolutionary or without precedent.

FIG. 9C is a flow chart illustrating an exemplary process 940 in managing the Gray Zone questions used in the questionnaire module 112. If a question in the CPI questionnaire is answered as "No, but may still require protection" the component is initially considered sensitive (block 942). The Gray Zone questions may be presented in the form of, for example, impact of loss questions (block 943) or difficulty to exploit questions (block 944). A recommendation may be forwarded to the analyst (block 945). Either the component remains sensitive, in which case additional questions regarding its eligibility for classification will be asked, or the component is no longer sensitive and will be considered unclassified.

If the recommendation forwarded by the computer is not accepted (block 946), the analyst may need to provide an explanation (block 947). In the event that the component is no longer considered sensitive (block 948), the analyst may need to explain why he or she considered the component sensitive in the first place (block 949). If the component is still sensitive (block 948), the P2E Wizard may ask questions to determine whether the component is eligible for classification (block 950). If it is not, the process exits (block 953). If it is eligible, then the classification level is determined (block 951) and whether additional security compartmentation is needed (block 952). The process 940 exits (block 953).

Figure 9D:
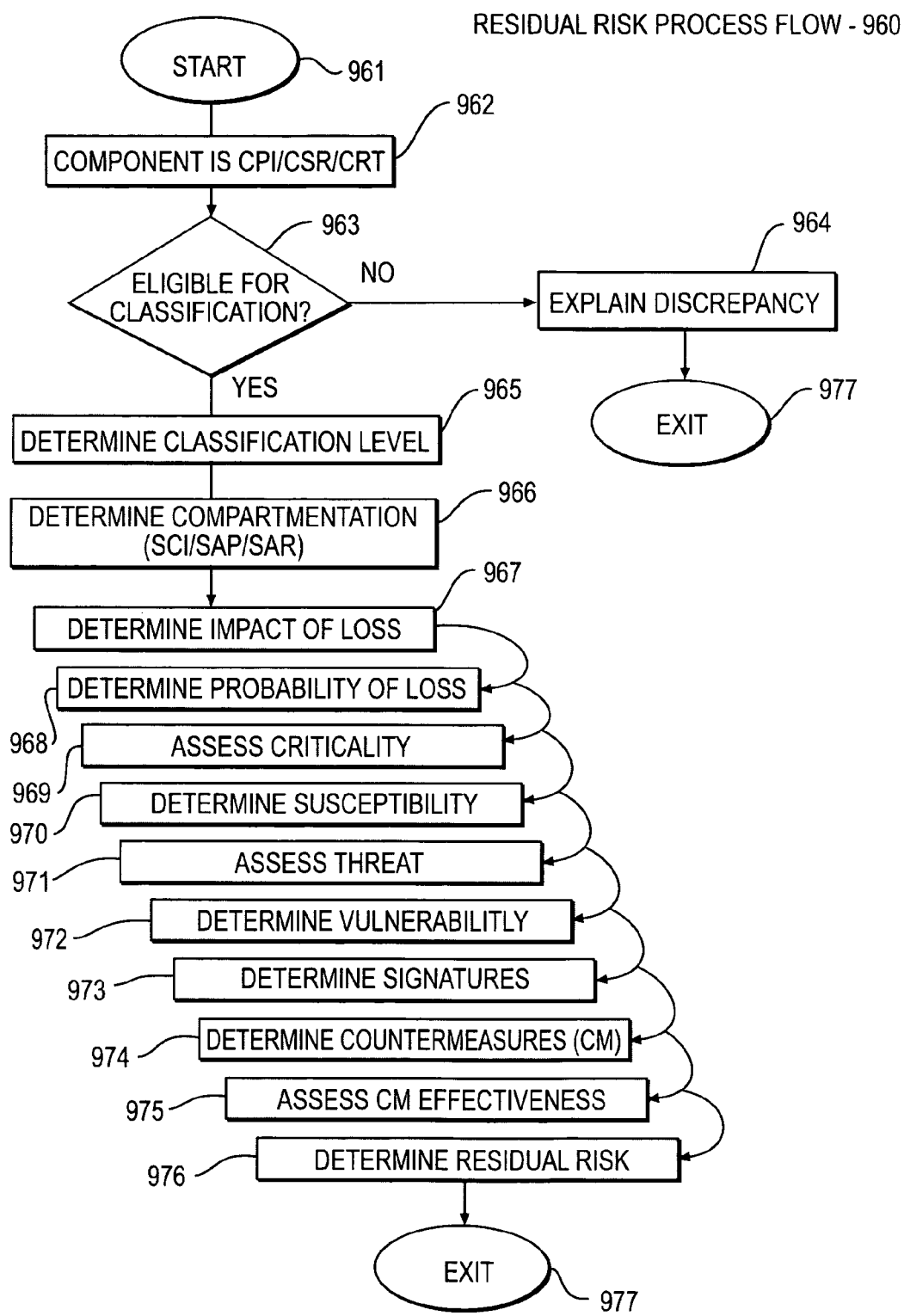
FIG. 9D is a flow chart illustrating an overall process to determine residual risks for critical program components using a P2E Wizard in the questionnaire module.

FIG. 9D is a flow chart illustrating an overall process 960 to determine the residual risk associated with a CPI, CSR, or CRT component using the P2E Wizard of the questionnaire module 112. This process 960 starts (block 961) with an identified CPI, CSR, or CRT component (block 962). The P2E Wizard determines, from a national security perspective, whether the component is eligible for classification under Executive Order 12958 (block 963). If the element is not eligible for classification the analyst needs to explain the discrepancy between why the component was identified as critical and why it is cannot be classified (block 964). If the component is eligible for classification, the P2E Wizard determines the level of classification (block 965) and whether additional compartmentation is required (block 966). Process 960 determines the impact of loss (block 967), determines the probability of loss (block 968), accesses the criticality of the component (block 969), determines the susceptibility of the component (block 970), accesses the threat to the component (block 971), determines the component's vulnerability (block 972), identifies signatures of the component that may reveal critical information (block 973), determines countermeasures (CM) used to mitigate those signatures (block 974), accesses the effectiveness of the countermeasures (block 975), and determines residual risk (block 976). The process 960 then exists (block 977). This process 960 may be applied to all of the identified CPIs and each CPI may have a numerical value for its residual risk.

The Criticality Assessment (block 969) may be determined by combining the Impact of Loss (block 967), which is a single index from 0 (Critical) to 4 (Unknown), and the Probability of Loss (block 968), which is also a single index from 0 (Critical) to 4 (Unknown). These two indices may be combined to determine the Assessment of Criticality, which is also a single index from 1 (High) to 4 (Unknown). A Critical rating is not allowed for recommended values. Analysts can override the recommended value but need to provide a rationale.

The Vulnerability Assessment (block 972) combines the Assessment of Susceptibility (block 970), which is a single index from 0 (Critical) to 4 (Unknown), and the Assessment of Threat (block 971), which is also a single index from 0 (Critical) to 4 (Unknown). These two indices may be combined to determine the Assessment of Vulnerability, which is also a single index from 1 (High) to 4 (Unknown). Analysts can override this value but need to provide a rationale.

Once the signatures and countermeasures have been identified (blocks 973, 974), the analyst makes an assessment of the countermeasures effectiveness (block 975). This is a single index from 0 (Critical) to 4 (Unknown). This value along with the Vulnerability Assessment value may be combined to determine the Residual Risk for the component (block 976), which is a single index from 1 (High) to 4 (Unknown). Analysts can override this value but need to provide a rationale.

Figure 9E:
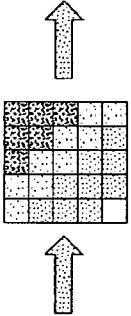
Figure 9F:
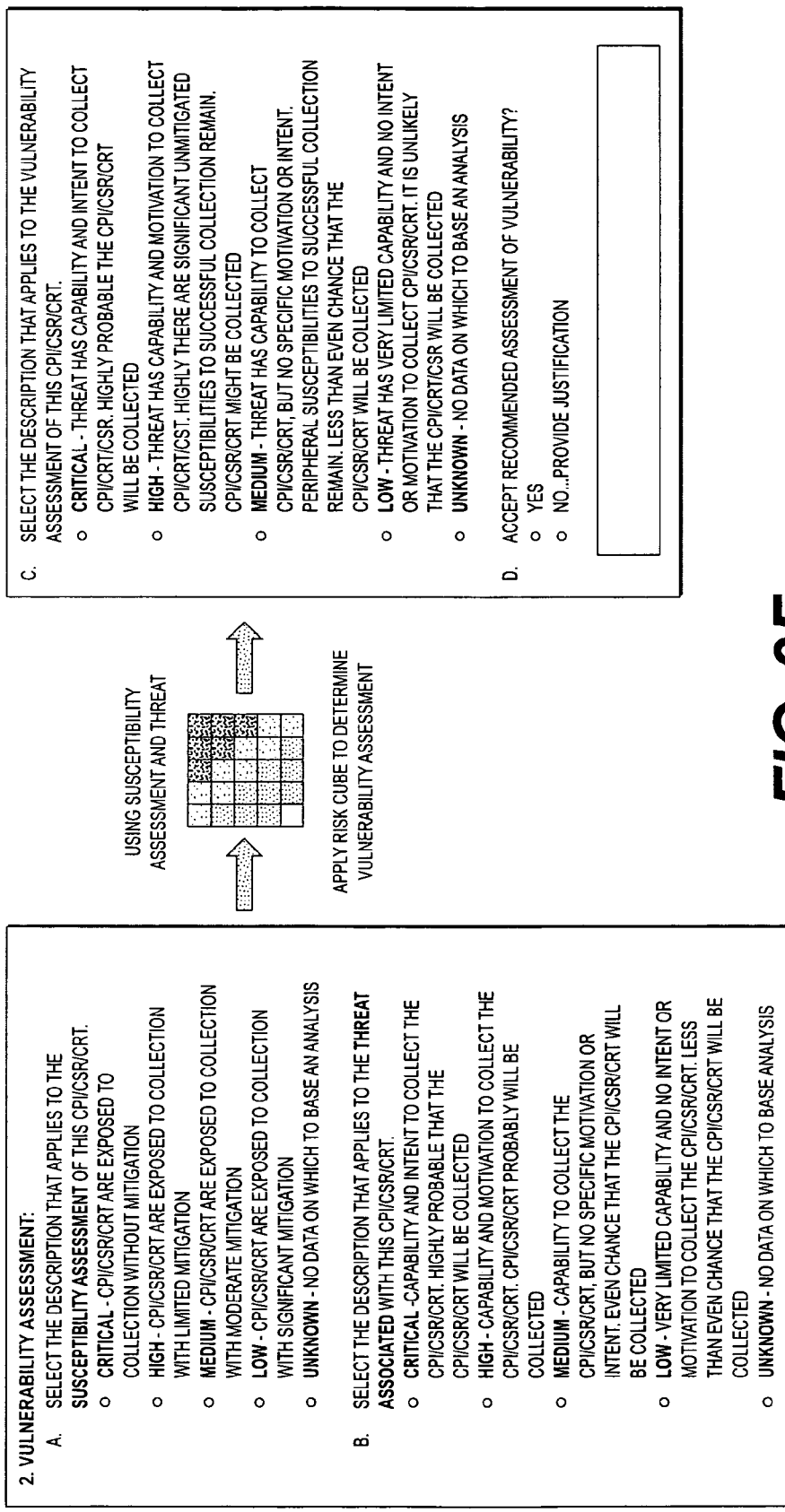

FIGS. 9E-9G illustrate exemplary processes in assessing criticality 980, assessing vulnerability 985, and assessing residual risks 990. These processes use the 5×5 Assessment Matrix 995 shown in FIG. 9H. Two factors may be involved. For example, FIG. 9E shows how the Assessment Matrix 995 is used to assess the Criticality of a component identified as CPI, CSR, or CRT. First, an assessment of the Impact of Loss is made by the analyst according to the scale:

A. Unknown—No data on which to base an analysis

B. Low—Little or no impact would be expected if this CPI/CSR/CRT was compromised C. Medium—Compromise of this CPI/CSR/CRT might degrade the operation of this system D. High—Loss would allow adversaries to defeat or degrade the operation of this mission essential system E. Critical—Loss would allow adversaries to defeat this mission critical system Next, an assessment of the Probability of Loss is made according to the scale:
- A. Unknown—No data on which to base an analysis
- B. Highly Unlikely—Little or no chance that this CPI/CSR/CRT will be compromised
- C. Slight—Less than even chance that this CPI/CSR/CRT will be compromised
- D. Probable—Even chance that CPI/CSR/CRT will be compromised
- E. Highly Likely—Better than even chance that damaging information will be obtained These two ratings become the vertical and horizontal axes in the 5×5 Assessment Matrix and yield an assessment of Criticality as illustrated in FIG. 9E. The same methodology applies for assessing Vulnerability (FIG. 9F) and Residual Risk (FIG. 9G).

The preceding process may be applied to each component in the system deconstruction module 110 and each subject area in the system programmatics module 114. The end result may be the identification of all critical program elements in an acquisition program requiring protection and the level at which those elements need to be protected.

As the analyst enters answers into the questionnaire module 112, a ruleset is processed to determine which question to ask next. Some questionnaires may be a continuous list of items such as those illustrated in the Criticality Assessment 930 questions are presented in a fixed order. Other questionnaires may have the order of questions determined by the ruleset using very complex logic.

Figure 10A:
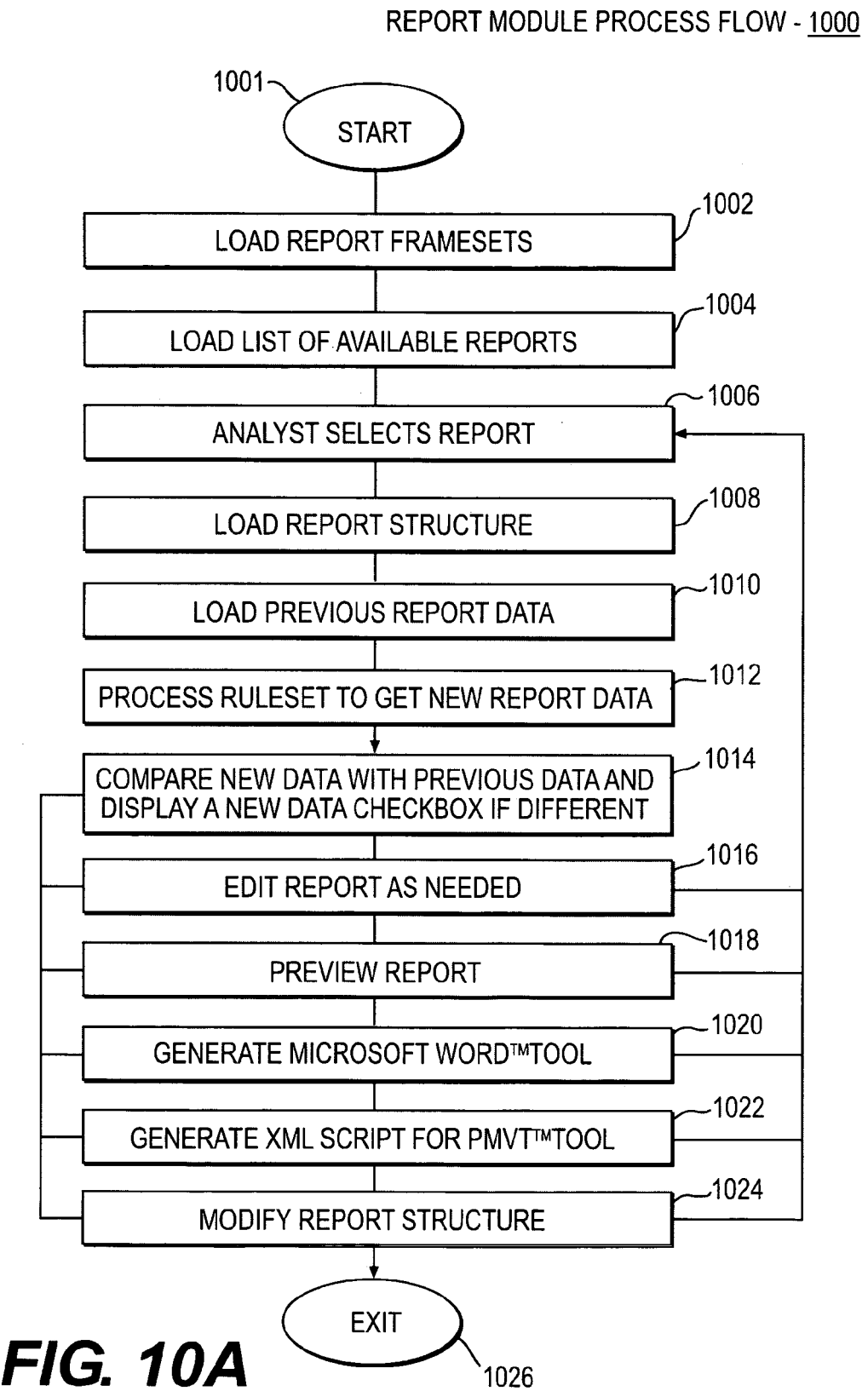
FIG. 10A is a flow chart illustrating an exemplary process of the report module of the P2E toolkit.

FIG. 10A is a flow chart illustrating an exemplary process 1000 of the report module 116. Many of the milestones and protection activities specified in the timeline module 108 may refer to the preparation, review, and approval of various plans, reports, and other required documentation. For example, most models require the preparation and periodic updates to the Security Classification Guide (SCG). These guides list all aspects of a program and how they are to be classified. These documents are reference guides instructing program administrators, managers, and engineers how to handle and classify the data and information they produce and work with on a daily basis. Results of the P2E Wizard, both from the system deconstruction module 110 and the system programmatics module 114, may contribute to the SCG. The "Fact of Statements" may be an integral part of any SCG.

Other types of reports may include Program Protection Plans, System Security Plans, Program Security Plan, Security Threat Assessment Report, and a Technology Assessment and Control Plan. Each of the acquisition models has their own set of reports. One skilled in the art will appreciate that other types of reports can be equally applied to the P2E toolkit 100.

The P2E toolkit 100 may manage all of the reports for all of the acquisition models. Each report structure may be stored in the master database. When a program is first created and the acquisition model is selected, all of the appropriate report structures may be copied from the master database into the working database for the program.

The process 1000 initiates the report module 116 (block 1001) by loading the framesets into the main content frame 316 (block 1002). One of the frames may display a list of all the reports that are available for the specific acquisition model and currently selected phase (block 1004). When the analyst selects a report (block 1006), the information about the report structure and any previously entered data may be retrieved from the program specific database (block 1008, 1010). The report may then be dynamically built from this information and displayed in, for example, an "edit mode."

Associated with each element in the report is a rule. The rules for the entire report may be processed (block 1012). These rules may process data from the tables that manage data entered from the other modules. The results from processing the rules may be compared with the data already in the program specific database for the report (block 1014). If a difference exists, a checkbox may be displayed by the report element indicating that new information is available (block 1014). Selecting the checkbox may append the new information to the existing data for the analyst to edit as needed (block 1016).

The analyst may work on the report on a section-by-section basis. Alternatively, the analyst may work on the entire report or view the entire report. The report can be displayed in a "preview" mode that removes the editing features and presents a near complete view of the report as it would be printed (block 1018). The report may also be formatted for use in Microsoft Word™ or any other Rich Text Format (rtf) compatible word processor (block 1020). The report can be further edited in Word if needed. The Word format, however, is intended primarily for printing and distribution.

One of the reports is a SCG. This report provides guidance on how to classify any aspect of the program. Northrop Grumman Corporation has developed a tool referred to as PMVT that can automatically portion mark any document given the appropriate SCG. For SCGs, the P2E toolkit 100 may generate an XML script that is compatible with PMVT (block 1022). PMVT is a Microsoft Word™ plug-in. Once the P2E toolkit SCG has been incorporated into PMVT, all of the other toolkit documents can be automatically portion marked once the Word version is generated.

The report structure is initially set up by copying the default structure from the master database. This default structure may not always be appropriate for a specific acquisition program. Analysts may therefore modify the report structure (block 1024). Modifications typically apply only to the report for the specific program they are working on. The report structure in the master database is not affected.

Figure 10B:

FIG. 10B illustrates an exemplary "edit mode" report interface 1070 of the report module 116. The left-hand side lists all of the reports appropriate for the acquisition model. FIG. 10C illustrates an exemplary CPI report 1080. The exemplary report 1080 acts as an executive summary of the overall security posture of the acquisition program. It lists all of the CPI/CSR/CRT elements identified in the system deconstruction module 110 and the system programmatics module 114. The results of the assessments illustrated in FIG. 9D may be compiled into a single "stoplight" display 1080 that is rank ordered from the most critical to the least critical (see FIG. 10C). Calculations of the numeric values for Program Risk, Risk Percentage, Overall Risk Value, and Overall Risk Rating shown at the far right and bottom of FIG. 10C will be described in more detail later.

As noted above, the P2E toolkit 100 identifies critical program elements requiring protection. For each of the critical elements, the criticality, susceptibility, threat assessment, vulnerability, and countermeasure effectiveness are combined to generate a Residual Risk Assessment. The following illustrates an exemplary method used in the calculations of the overall risk for an acquisition program. The exemplary method also aggregates overall program risks to a system-of-systems or architecture level. The exemplary method enables program managers to get a snapshot view of program health and where to focus resources. The exemplary method is described below for illustration purposes only. One skilled in the art will appreciate that other types of risk calculation methods may be equally applied to the P2E toolkit 100.

In previous formulations, a rating for Criticality was not factored into the Residual Risk Assessment nor was there a means for aggregating the Residual Risk Assessment across CPIs to produce an overall Program Risk Assessment. FIG. 10D shows an exemplary equation 1090 used to represent the overall program risk, which is a summation of the individual residual risk values computed for each CPI. The following exemplary formulation may address both the inclusion of the Criticality Rating and aggregation across CPIs to give an overall Program Risk Assessment.

The basic idea is to represent the risk in normalized vector notation. Mathematically, a normalized Program Risk (PR) vector can be written as:

$$PR = \frac{\sum \omega_i R_i}{\sqrt{\sum (\omega_i R_i)^2}}$$

where $R_i$ are the Residual Risk Assessments for each of the CPIs and the $\omega_i$ are their Criticality Ratings. The summation is over all of the identified CPIs in the P2E toolkit. The number of CPIs in a program does not limit this formulation.

For example, suppose three CPIs are identified: Avionics Package (A), Communication Frequency (F), and Contractor Relationship (C). These three CPIs represent a 3-dimensional space. Also assume the analyst has performed Susceptibility and Threat assessments and that the 5×5 Assessment Matrix is used to obtain a Vulnerability Assessment.

| CPI | Susceptibility | Threat | Vulnerability |
|-----|---------------|--------|---------------|
| A | B (Low) | E (Critical) | Yellow(Med) - C |
| F | E (Critical) | E (Critical) | Red (High) - D |
| C | C (Med) | E (Critical) | Red (High) - D |

In this example, the model does not allow two critical ratings to generate a critical rating (see the Frequency row). In the P2E toolkit 100, the analyst has the ability to change any derived rating, but a rationale justifying the change must be provided. In this case, a Critical vulnerability rating may require an analyst to elevate the derived High (Red) rating and provide a justification.

The analyst has also performed an assessment of the Residual Risk by combining assessments of the Vulnerability and Countermeasure Effectiveness.

| CPI | Vulnerability | CM Effectiveness | Residual Risk |
|-----|--------------|------------------|---------------|
| A | B (Med) | E (None) | Yellow(Med) - C |
| F | D (High) | E (None) | Red (High) - D |
| C | D (High) | E (None) | Red (High) - D |

In this example, the analyst has also completed a Criticality Assessment for each of these CPIs. Criticality is a derived value from the 5×5 Assessment Matrix where the Impact of Loss and the Probability of Loss are the vertical and horizontal axes.

| CPI | Impact of Loss | Probability of Loss | Criticality |
|-----|---------------|--------------------|-----|
| A | E (Critical) | B (Highly Unlikely) | Yellow(Med) - C |
| F | D (High) | C (Slight) | Yellow (Med) - C |
| C | D (High) | E (Highly Likely) | Red (High) - D |

Casting the Residual Risk and Criticality ratings into numerical values yields:

| CPI | Residual Risk | Criticality |
|-----|---------------|-------------|
| A | .50 | .50 |
| F | .70 | .50 |
| C | .70 | .70 |

These numerical are the midpoints of the following ranges:
A=0.0 to 0.2
B=0.2 to 0.4
C=0.4 to 0.6
D=0.6 to 0.8
E=0.8 to 1.0
The normalized vector equation for the Program Risk becomes:

$$PR = \frac{(0.5)(0.5)A + (0.7)(0.5)F + (0.7)(0.7)C}{\sqrt{([(0.5)(0.5)]^2 + [(0.7)(0.5)]^2 + [(0.7)(0.7)]^2)}}$$

$$PR = 0.38A + 0.54F + 0.75C$$

Moreover, taking the square of each of the coefficients gives the percentage of the overall risk attributed to each of the CPIs. In this case 14.4% is due to the Avionics. 29.2% to Frequency, and 56.3% to Contractor Relationships. Note that these percentages total to 100%. These percentages provide Program Managers (PM) insights into where resources need to be allocated to reduce the risk. Using the example, over 56% of the overall risk is attributed to the Contractor Relationship. If the program office has not provided adequate protection or countermeasures, the PM may decide to reduce the relative percentage by increasing support in this area. Since these equations are normalized, the percentages will add to 100. Therefore, the term relative percents are used.

In an absolute sense, the length of the PR vector is the normalization factor (denominator of the equation). In the example this is 0.652. Reduction of the overall risk will reduce this value but the normalized coefficients will give relative percentages.

Although the components of the vector are distinct entities, one can think of the length of the vector as a measure of the overall risk of the program. Since all the values are associated with risk, the ideal may be for all the values to approach zero. For the overall risk value, the ideal may be for the length of the vector to also approach zero. Note that the maximum value may be the square root of the number of components that make up the vector. In the example, this is the square root of 3 or 1.73. In this example, the length is 0.652, indicating a low risk compared to the maximum of 1.73. The ratio of 0.652 to 1.73 is 0.38, which is rated at a Low to Low-Medium risk.

Similar calculations using the minimum and maximum values for the A to E ranges may also be computed.

This exemplary model can be extended to multiple programs. The calculations can be performed for each of the separate programs. Using the Overall Risk Value for each program, a composite system risk (SR) vector can be written:

$$SR = \frac{\sum \alpha_i PR_i}{\sqrt{\sum (\alpha_i PR_i)^2}}$$

Where $\alpha_i$ are the lengths of each of the Program Risk vectors. Extending the model to a system of systems or architecture may follow the same pattern.

Figure 11A:
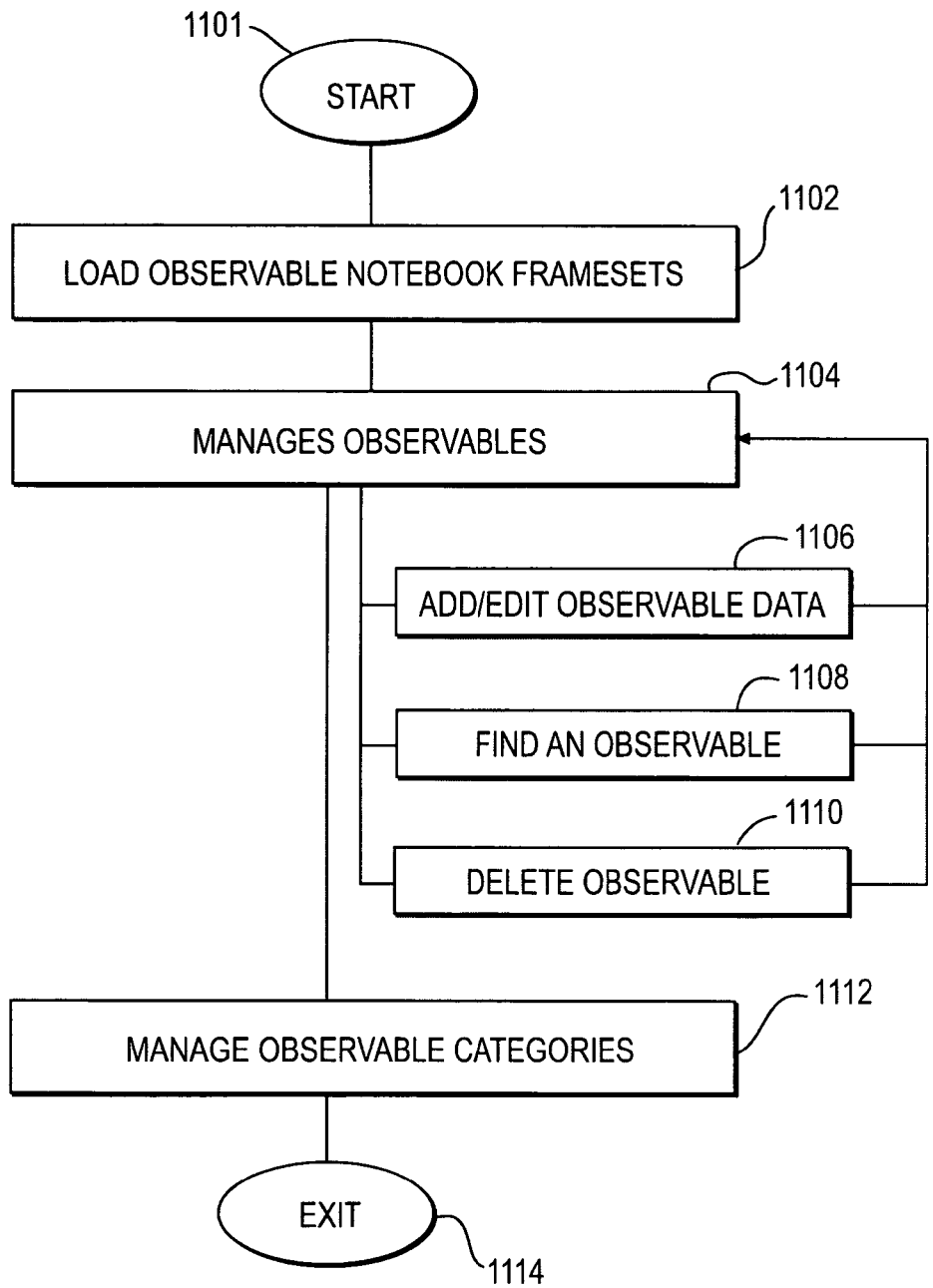
FIG. 11A is a flow chart illustrating an exemplary process for the observable notebook module of the P2E toolkit.

FIG. 11A is a flow chart of an exemplary process 1100 for the observable notebook module 118. The observable notebook module 118 typically tracks and manages operational security issues associated with the acquisition program. The observable notebook module 118 may not be used to a great extent in the early phase of the acquisition lifecycle. However, as programs move from concept and design into prototyping, manufacturing, deployment, and operations, security professionals need to pay attention to indicators that provide adversaries insights into program details. The observable notebook module 118 may be used to manage those observables and to develop interventions or countermeasures to minimize or mitigate disclosure or compromise of program specific information.

Process 1100 begins by loading the framesets for the observable notebook module 1102. The analyst may have an option to manage the observables 1104 by either adding and editing observable information (block 1106), finding or searching for observables having specific information (block 1108), or deleting an existing observable (block 1110). The data pertaining to an observable (block 1106) may include a description of the observable, which timeline phase it belongs, point of contact information for who submitted the information, data about the threat, potential impact to the program, likelihood of occurrence, containment recommendations, and residual risk to the acquisition program. Searching the data to find specific observables (block 1108) may utilize either a basic search or an advanced search methods. Basic search may be simple test searches with appropriate text items checked for inclusion in the search. More advanced searches would include the ability to select any or all of the observable notebook data fields and to specify date windows for those fields spanning a period of time. Deleting an observable 1110 may be a function that allows the analyst to effectively manage the database records.

Managing observable categories 1112 may provide the analyst the ability to create and define new criteria for categorizing observables. This type of management flexibility may be important in managing and reporting on observables during long and complex acquisition programs.

Figure 11B:
FIG. 11B illustrates an exemplary observable notebook interface.

FIG. 11B illustrates an exemplary observable notebook interface 1190. This example shows where a listing of observables would appear at the top 1192 while a detail data entry panel is at the bottom 1194. Interfaces for search and managing categories may have separate interfaces.

It should be noted that the data gathered from the system deconstruction 110, system programmatics 114, report 116, and observable notebook 118 modules may be stored on a timeline module 108 phase basis. As the acquisition program progresses the timeline will move from phase to phase. The Phases menu 1196, which may be available for all modules, displays the current timeline phase. As the timeline advances, the analyst will close one phase and move to the next. The P2E toolkit may make a copy all of the data input from the previous phase. The data in the previous phase becomes read-only and serves as an audit trail for the decisions that were made during that phase. The copied data then becomes the working data for the next phase. Analysts can add to a edit that data to reflect the existing state of the acquisition during that phase.

Figure 12A:
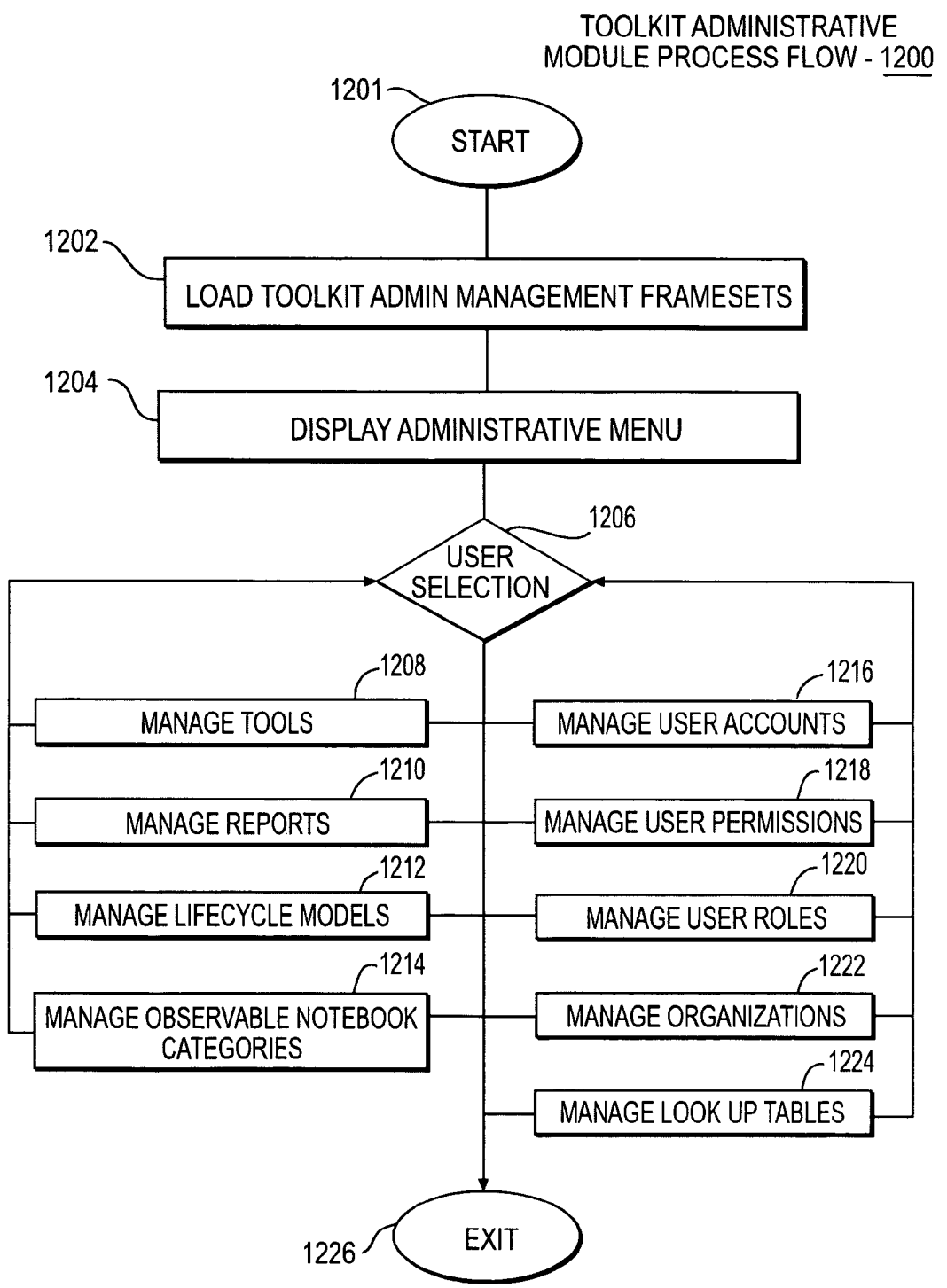
FIG. 12A is a flow chart illustrating an exemplary process for the toolkit administrative module of the P2E toolkit.

FIG. 12A is a flow chart of an exemplary process 1200 for the toolkit administrative module 120. This module may be used to manage a number of components of the P2E toolkit. The process 1200 begins by loading the toolkit management module framesets 1202. The display may consist of only a menu of management options 1204 from which the user selects 1206. Selections may include options for the P2E toolkit components or options for specific database tables.

Authorized users may create new modules or utilities for the P2E toolkit 100 and may "register" them using this capability. A setting in the toolkit administrative module 120 may allow items to appear on the main Tools menu (block 1208). The toolkit administrative module 120 may manage reports so that users can create new or modify existing report templates (block 1210). The toolkit administrative module 120 may also manage lifecycle models 1212 to allow users to create new or modify existing timeline models. The toolkit administrative module 120 may further manage observable notebook categories to add or edit the category listing in the observable notebook module 118 (block 1214).

When authorized users create or change lifecycle models or reports in the toolkit administrative module 120 they may modify the master database. These are changes may be made to the master database templates and may affect any new program that use the lifecycle model as a starting point.

In addition, the toolkit administrative module 120 may manage user accounts 1216 to create or edit the accounts of authorized P2E toolkit users. It may manage user permissions to set Read, Write, Admin, and Master permissions for users (block 1218). The admin permission allows users to modify the timeline and report structures on a program by program basis. The users cannot modify the Master templates. Master users, however, can modify the timeline and report templates in the master database. The toolkit administrative module 120 may further manage user roles 1220 to allow new roles to be created and incorporated into the system. The toolkit administrative module 120 may also manage organizations to allow the user to create and edit a list of organizations, points of contact, and address information (block 1222). Furthermore, the toolkit administrative module 120 may manage a lookup table items 1224. The lookup table is a list of items appearing in dropdown boxes or items needed for internal controls. The toolkit administrative module 120 may allow the analyst to add to or modify the existing settings.

FIG. 12B illustrates an exemplary toolkit administrative module interface 1290. The toolkit administrative module may be accessed through the Resource Management option in the Administration menu 1292. The toolkit administrative module 120 may function like the other modules. The main content frame may initially display a menu listing all of the areas that need to be maintained. Each of these functionalities may display two tables—one is a listing of the current items in the P2E toolkit 100 and the other allows the user to make additions, deletions, or any required adjustments 1294. For example, selecting manage user accounts may show a list of P2E toolkit users. Selecting a specific user may display the details of the account in the second table, such as user name, login name, and contact information. Any of the detailed information can be edited. New accounts may be created and old ones may be archived.

Figure 13:
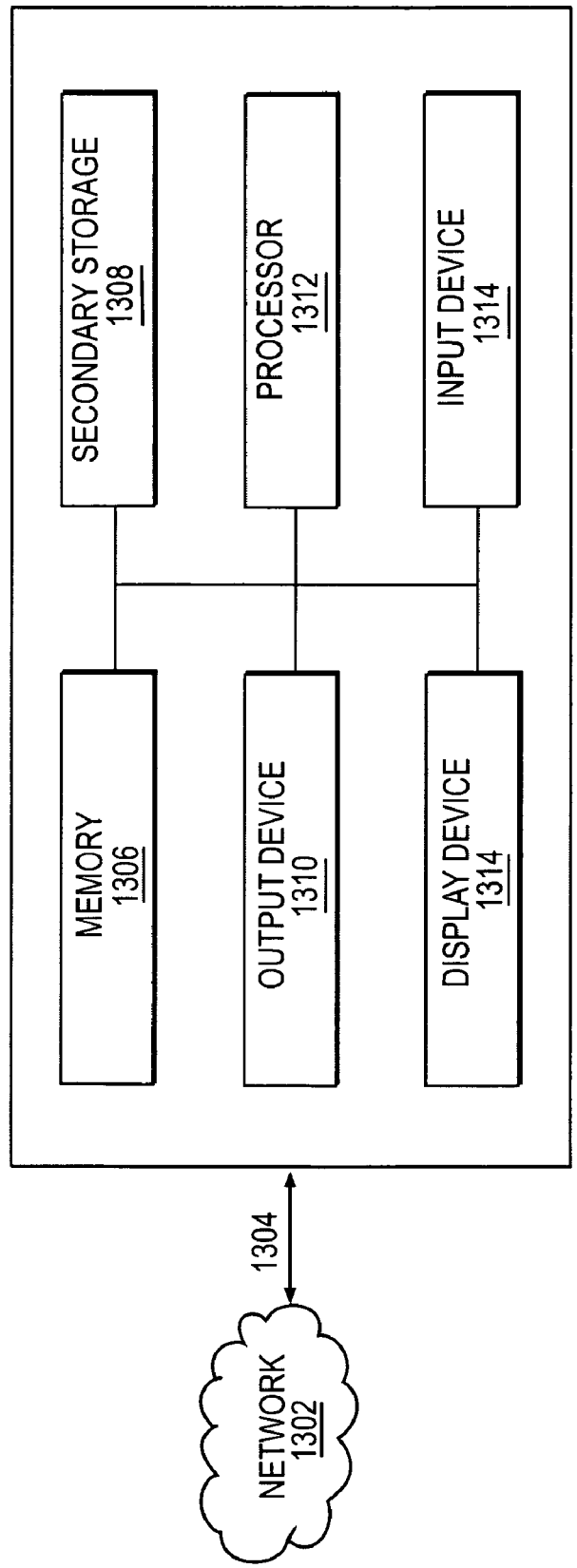
FIG. 13 illustrates exemplary hardware components of a computer that may be used in connection with the exemplary method for providing program protection engineering, security management, and report preparation for sensitive and classified projects.

FIG. 13 illustrates exemplary hardware components of a computer 1300 that may be used in connection with the method for providing program protection engineering, security management, and report preparation for sensitive and classified projects. The computer 1300 includes a connection 1304 with a network 1302 such as the Internet or other type of computer or telephone network. The computer 1300 typically includes a memory 1306, a secondary storage device 1308, an output device 1310, a processor 1312, a display device 1314, and an input device 1316.

The memory 1306 may include random access memory (RAM) or similar types of memory. The secondary storage device 1308 may include a hard disk drive, floppy disk drive, CD-ROM drive, or other types of non-volatile data storage, and may correspond with various databases or other resources. The processor 1312 may execute information stored in the memory 1306, the secondary storage 1308, or received from the Internet or other network 1302. The input device 1316 may include any device for entering data into the computer 1300, such as a keyboard, keypad, cursor-control device, touch-screen (possibly with a stylus), or microphone. The display device 1314 may include any type of device for presenting visual image, such as, for example, a computer monitor, flat-screen display, or display panel. The output device 1310 may include any type of device for presenting data in hard copy format, such as a printer, and other types of output devices including speakers or any device for providing data in audio form. The computer 1300 can possibly include multiple input devices, output devices, and display devices.

Although the computer 1300 is depicted with various components, one skilled in the art will appreciate that the computer 1300 can contain additional or different components. In addition, although aspects of an implementation consistent with the method providing program protection engineering, security management, and report preparation for sensitive and classified projects are described as being stored in memory, one skilled in the art will appreciate that these aspects can also be stored on or read from other types of computer program products or computer-readable media, such as secondary storage devices, including hard disks, floppy disks, or CD-ROM; a signal embodied in a carrier wave from the Internet or other network; or other forms of RAM or ROM. The computer-readable media may include instructions for controlling the computer 1300 to perform a particular method.

While the apparatus and method for providing program protection engineering, security management, and report preparation for sensitive and classified projects have been described in connection with an exemplary embodiment, those skilled in the art will understand that many modifications in light of these teachings are possible, and this application is intended to cover variations thereof.

What is claimed is:

1. An apparatus for providing program protection engineering, security management, and report preparation for sensitive and classified projects, comprising:

A processor;

A program protection engineering (P2E) toolkit configured to:

log into a program protection engineering (P2E) toolkit;

specify an acquisition program, wherein the acquisition program includes technical components, system components, and programmatic components;

copy variables from a master database to a program specific database, wherein the variables include timeline phase groups, phases, milestones, protection activities for the specified acquisition program, and templates for required report documents;

provide and displaying a timeline of the specified acquisition program;

identify the technical components, system components, and programmatic components that need security protections;

identify critical technical components, critical system components, and critical programmatic components using questionnaires directed to the technical components, system components, and programmatic components, further comprising determining an impact of loss, a difficulty to exploit, the eligibility for classification, a classification level, and a sensitive compartmented information (SCI)/special access program (SAP)/special access requirements (SAR) level based on said questionnaires;

classify said critical technical components, said critical system components, and said critical programmatic components as critical program information (CPI), critical system resources (CSR), and critical research technologies (CRT) components;

use gray zone questions to determine whether technical components, system components, and programmatic components not initially classified as critical still need security protection, said gray zone questions including questions determining an impact of loss or a difficulty to exploit;

Based on said determination, classify those technical components, system components, and programmatic components that were not initially found to be critical into said CPI, CSR, and CRT components;

determine factors including criticality, vulnerabilities, threats, susceptibilities, and countermeasures for each said classified CPI, CSR, and CRT component by applying an assessment matrix;

combine said factors for each classified CPI, CSR, and CRT component to generate residual risk values;

providing reports based on timeline phase and specific acquisition program reporting requirements, said reports including an overall risk for said specified acquisition program based on said residual risks for each CPI, CSR, and CRT component;

wherein the program protection engineering (P2E) toolkit, comprises:

a core architectural module that provides internal navigational controls, standard style sheets, and standard color palettes, database connectivity, text string functions, date functions, encryption and decryption algorithms, user permission functions, hidden data value transfer functions, window functions, table handling functions, floating menu handling functions, combo box and list box functions, frame functions, menu functions, image functions, document and report functions, sorting functions, and password validation functions;

a program information module that provides information on a user specified acquisition program, wherein the user specified acquisition program includes technical components, system components and programmatic components;

a timeline module that provides and displays a timeline of the user specified acquisition program;

a system deconstruction module that identifies the technical components that need security protections using questionnaires directed to the technical components;

a system programmatics module that identifies the programmatic components that need security protections using questionnaires directed to the programmatic components;

a questionnaire module that presents questionnaires to determine factors including criticality, vulnerabilities, threats, susceptibilities, countermeasures, and a residual risk for each technical component and each programmatic component that need security protections; and a report module that provides a report based on user specified reporting requirements of the user specified acquisition program.

2. The apparatus of claim 1, wherein the P2E toolkit further comprises:

an observable notebook module that provides information and manages operational security concerns; and a toolkit administrative module that manages user accounts and user permissions.

3. The apparatus of claim 2, wherein the observable notebook module identifies and monitors operational security (OPSEC) observables.

4. The apparatus of claim 2, wherein the toolkit administrative module provides login and password control and is capable of creating a new user specified acquisition program, opening an existing user specified acquisition program, and managing the P2E toolkit.

5. The apparatus of claim 1, wherein the P2E toolkit copies variables from a master database to a program specific database, wherein the variables include phase groups, phases, milestones, protection activities, and report templates for the user specified acquisition program.

6. The apparatus of claim 1, wherein the timeline module provides a graphical display of timeline charts, milestones, and protection activities of the user specified acquisition program.

7. The apparatus of claim 1, wherein the timeline module provides a specification of start, end, and completion dates for milestones and activities of the user specified acquisition program.

8. The apparatus of claim 1, wherein the timeline module provides a notification of overdue milestones and activities of the user specified acquisition program.

9. The apparatus of claim 1, wherein the timeline module enables the user to modify milestones and activities in the timeline module.

10. The apparatus of claim 1, wherein the timeline module enables the user to create multiple timelines for the insertion of new technology in the timeline module.

11. The apparatus of claim 1, wherein the system deconstruction module provides a breakdown tree structure for identification of critical technical components.

12. The apparatus of claim 11, wherein the system deconstruction module uses questionnaires for each node in the breakdown tree structure.

13. The apparatus of claim 12, wherein the questionnaires are selected from a group consisting of system programmatics, criticality assessment, Gray Zone issues, eligibility determination, classification level determination, sensitive compartmented information (SCI) determination, identification of countermeasures, and assessment of residual risks.

14. The apparatus of claim 1, wherein the system programmatics module provides operational support for the user specified acquisition program, including support for budget, contractor relationships, technical methods and plans, training, maintenance, and testing issues.

15. The apparatus of claim 14, wherein the system programmatics module uses questionnaires for each issue in the system programmatics module.

16. The apparatus of claim 15, wherein the questionnaires are selected from a group consisting of system programmatics, criticality assessment, Gray Zone issues, eligibility determination, classification level determination, sensitive compartmented information (SCI) determination, identification of countermeasures, and assessment of residual risks.

17. The apparatus of claim 1, wherein the questionnaire module contains a ruleset to determine an order for presenting questionnaires to the user.

18. The apparatus of claim 1, wherein the report module provides reports with a paragraph layout and reports with a tabular style.

19. The apparatus of claim 1, wherein the report module enables the user to configure a report structure to accommodate specific customer requirements.

20. The apparatus of claim 1, wherein the report module generates a rich text format (rtf) file.

21. The apparatus of claim 1, wherein the report module generates an extensible markup language (XML) file for security classification guides (SCG).

22. The apparatus of claim 1, wherein the core architectural module is capable of incorporating modules developed at a future time.

23. A method for providing program protection engineering, security management, and report preparation for sensitive and classified projects, comprising:

logging into a program protection engineering (P2E) toolkit;

specifying an acquisition program, wherein the acquisition program includes technical components, system components, and programmatic components;

copying variables from a master database to a program specific database, wherein the variables include timeline phase groups, phases, milestones, protection activities for the specified acquisition program, and templates for required report documents;

providing and displaying a timeline of the specified acquisition program;

identifying the technical components, system components, and programmatic components that need security protections;

identifying critical technical components, critical system components, and critical programmatic components using questionnaires directed to the technical components, system components, and programmatic components, further comprising determining an impact of loss, a difficulty to exploit, the eligibility for classification, a classification level, and a sensitive compartmented information (SCI)/special access program (SAP)/special access requirements (SAR) level based on said questionnaires;

classifying said critical technical components, said critical system components, and said critical programmatic components as critical program information (CPI), critical system resources (CSR), and critical research technologies (CRT) components;

using gray zone questions to determine whether technical components, system components, and programmatic components not initially classified as critical still need security protection, said gray zone questions including questions determining an impact of loss or a difficulty to exploit;

Based on said determination, classifying those technical components, system components, and programmatic components that were not initially found to be critical into said CPI, CSR, and CRT components;

utilizing said P2E toolkit to determine factors including criticality, vulnerabilities, threats, susceptibilities, and countermeasures for each said classified CPI, CSR, and CRT component by applying an assessment matrix;

combining said factors for each classified CPI, CSR, and CRT component to generate residual risk values;

providing reports based on timeline phase and specific acquisition program reporting requirements, said reports including an overall risk for said specified acquisition program based on said residual risks for each CPI, CSR, and CRT component.

24. The method of claim 23, wherein the P2E toolkit comprises modules including a core architectural module, program information module, a timeline module, a system deconstruction module, a system programmatics module, and a report module.

25. The method of claim 23, further comprising using a system deconstruction module to identify the technical components that need security protections.

26. The method of claim 23, further comprising using a system programmatics module to identify the programmatic components that need security protections.

27. The method of claim 23, further comprising:

providing an observable notebook to identify, track, and manage operational security issues throughout an acquisition lifecycle; and providing a toolkit administrative module to manage user accounts and toolkit configuration.

28. The method of claim 23, wherein the providing the timeline step comprises:

loading the phase groups and the phases from the program specific database;

loading the milestones and the protection activities for a specific phase;

displaying the milestones and the protection activities in a menu;

inserting multiple timeline tracks when new technologies are inserted into the timeline module; and enabling the user to select from a group consisting of: a specific milestone, a specific activity, an activity link, a phase timeline, a lifecycle timeline, a milestone and activity management option, and a phase management option.

29. The method of claim 25, wherein said system deconstruction module further performs the following steps:

enabling the user to insert one or more nodes under a root node in a tree structure, each node representing a component of the acquisition program;

for each node inserted into the tree structure, providing basic information identifying the component associated with the node; and for the component associated with each node, determining whether the component requires security protection measures and if it is a critical component of the acquisition program.

30. The method of claim 26, wherein said system programmatics module further performs the following steps:

retrieving a system programmatics tree structure from the master database, the system programmatics tree structure including nodes representing system programmatics questions;

expanding nodes to a lowest level to indicate specific questions that need to be answered;

enabling the user to provide a formal answer to a system programmatics question;

determining whether the formal answer requires security protections and if it is a critical component of the acquisition program;

using a fact of statement question to ask for facts that can be derived from the formal answer; and determining whether statements associated with the fact of statements require security protections.

31. The method of claim 30, wherein the formal answer to said system programmatics question is determined by leading the user through a series of questions designed to identify risks associated with each component.

32. The method of claim 23, further comprising using a questionnaire module configured to identify critical technical, system and programmatic components by:

passing a question index indicating which specific question is the beginning;

initializing questionnaire variables;

retrieving question specifics from the program specific database;

retrieving previous answers from the program specific database;

constructing questions based on a question type;

accepting an answer from the user;

saving the answer to the program specific database;

processing specific rules; and determining a next question index.

33. The method of claim 23, further comprising using Gray Zone questions to determine whether a component requires security precautions by:

determining an impact of loss;

determining a difficulty to exploit;

determining the eligibility for classification;

determining a classification level;

determining a sensitive compartmented information (SCI)/special access program (SAP)/special access requirements (SAR) level.

34. The method of claim 23, wherein the steps of generating the residual risk include, for each critical program information (CPI), critical system resource (CSR), and critical research technology (CRT) component:

determining the eligibility for classification;

determining a classification level;

determining a sensitive compartmented information (SCI)/special access program (SAP)/special access requirements (SAR) level;

determining an impact of loss;

determining a probability of loss;

assessing a criticality;

determining a susceptibility;

assessing a threat;

determining a vulnerability;

determining signatures;

determining countermeasures;

assessing effectiveness of the countermeasures; and determining a residual risk.

35. The method of claim 23, wherein the providing the report step comprises:

loading report framesets into a main content frame;

loading a list of available reports for the specified acquisition program and a current phase;

retrieving information regarding a report structure and previously entered report data from the program specific database;

process a ruleset to obtain new report data; and comparing the new report data with the previously entered report data.

36. The method of claim 35, wherein the providing the report step further comprises:

editing the report;

previewing the report;

generating an extensible markup language (XML) file for security classification guides compatible with a verification tool;
generating a printable version of the report; and
modifying the report structure.

37. The method of claim 23, further comprising providing an interface for the user to interact with the P2E toolkit.

38. The method of claim 37, wherein the providing the interface step comprises:
enabling the use to select a module from a tools menu;
loading module framesets;
loading server-side functions and server-side variables at a server-side;
processing the server-side functions and the server-side variables;
linking the server-side functions and the server-side variables with client-side functions at a client-side;
transferring the server-side variables to the client-side;
generating a web-page using the server-side variables;
displaying data on the web-page;
processing user actions using off screen frames;
validating data input from the user; and
updating the database in the off screen frames.

39. The method of claim 37, wherein the providing the interface step further comprises:
processing user login and passwords,
loading core module framesets;
loading resource menu frame and navigational functions; and
loading a content frame with a welcome message.

40. A non-transitory computer readable medium comprising instructions for providing program protection engineering, security management, and report preparation for sensitive and classified projects, wherein said instructions perform the following method steps when executed:
logging into a program protection engineering (P2E) toolkit;
specifying an acquisition program, wherein the acquisition program includes technical components, system components, and programmatic components;
copying variables from a master database to a program specific database, wherein the variables include timeline phase groups, phases, milestones, protection activities for the specified acquisition program, and templates for required report documents;
providing and displaying a timeline of the specified acquisition program;
identifying the technical components, system components, and programmatic components that need security protections;
identifying critical technical components, critical system components, and critical programmatic components using questionnaires directed to the technical components, system components, and programmatic components, further comprising determining an impact of loss, a difficulty to exploit, the eligibility for classification, a classification level, and a sensitive compartmented information (SCI)/special access program (SAP)/special access requirements (SAR) level based on said questionnaires;
classifying said critical technical components, said critical system components, and said critical programmatic components as critical program information (CPI), critical system resources (CSR), and critical research technologies (CRT) components;
using gray zone questions to determine whether technical components, system components, and programmatic components not initially classified as critical still need security protection, said gray zone questions including questions determining an impact of loss or a difficulty to exploit;
Based on said determination, classifying those technical components, system components, and programmatic components that were not initially found to be critical into said CPI, CSR, and CRT components;
utilizing said P2E toolkit to determine factors including criticality, vulnerabilities, threats, susceptibilities, and countermeasures for each of said classified CPI, CSR, and CRT component by applying an assessment matrix;
combining said factors for each classified CPI, CSR, and CRT component to generate residual risk values;
providing reports based on timeline phase and specific acquisition program reporting requirements, said reports including an overall risk for said specified acquisition program based on said residual risks for each CPI, CSR, and CRT component.

41. The computer readable medium of claim 40, wherein the P2E toolkit comprises modules including a core architectural module, program information module, a timeline module, a system deconstruction module, a system programmatics module, and a report module.

42. The computer readable medium of claim 40, further comprising using a system deconstruction module to identify the technical components that need security protections.

43. The computer readable medium of claim 40, further comprising using a system programmatics module to identify the programmatic components that need security protections.

44. The computer readable medium of claim 40, further comprising instructions for:
providing an observable notebook module to identify, track, and manage operational security issues during an acquisition lifecycle; and
providing a toolkit administrative module to manage user accounts and toolkit configuration.

45. The computer readable medium of claim 44, wherein the observable notebook module manages operational security issues, and wherein the computer readable medium further comprises instructions for:
identifying operational security issues;
assigning a point of contact for managing the issue;
managing status, impact, and threat levels for each observable; and
describing a containment method and residual risk for each observable.

46. The computer readable medium of claim 44, wherein the toolkit administrative module manages user accounts, toolkit configuration, and various look up list items used throughout the toolkit, and wherein the computer readable medium further comprises instructions for:
managing user accounts and permissions;
managing a status of tools available in the toolkit; and
managing look up values for various lists in the toolkit including contents for all dropdown lists, lists of organizations, master templates for acquisition models and report structures, and numerical values used in calculations.

47. The computer readable medium of claim 40, wherein the instructions for providing and displaying the timeline comprise:
loading the phase groups and the phases from the program specific database;
loading the milestones and the protection activities for a specific phase;

displaying the milestones and the protection activities in a menu;

inserting multiple timeline tracks when new technologies are inserted into the timeline module; and enabling the user to select from a group consisting of: a specific milestone, a specific activity, an activity link, a phase timeline, a lifecycle timeline, a milestone and activity management option, and a phase management option.

48. The computer readable medium of claim 40, wherein the instructions for using the system deconstruction module comprise:

enabling the user to insert one or more nodes under a root node in a component breakdown tree structure;

for each node inserted into the tree structure, providing basic information identifying the component associated with the node; and for the component associated with each node, determining whether the component requires security protection measures and if it is a critical component of the acquisition program.

49. The computer readable medium of claim 40, wherein the instructions for using the system programmatics module comprise:

retrieving a system programmatics tree structure from the master database, the system programmatics tree structure including nodes representing system programmatics questions;

expanding nodes to a lowest level to indicate specific questions that need to be answered;

enabling the user to provide a formal answer to a system programmatics question;

determining whether the formal answer requires security protections;

using a fact of statement question to ask for facts that can be derived from the formal answer; and determining whether statements associated with the fact of statement require security protections.

50. The computer readable medium of claim 40, wherein the questionnaire module presents questions, and wherein the computer readable medium further comprises instructions for:

passing a question index indicating which specific question is the beginning;

initializing questionnaire variables;

retrieving question specifics from the program specific database;

retrieving previous answers from the program specific database;

constructing questions based on a question type;

accepting an answer from the user;

saving the answer to the program specific database;

processing specific rules; and determining a next question index.

51. The non-transitory computer readable medium of claim 40, wherein the report module presents reports based on current acquisition phase and reporting requirements, and wherein the computer readable medium further comprises instructions for:

loading report framesets;

loading a list of available reports;

enabling the user to select a specific report;

loading a report structure from the program specific database;

processing a ruleset to populate the report using database information;

retrieving previously entered report information and showing a presence of new or modified data;

enabling the user to edit the report, preview the report, and generate a Microsoft Word compatible version of the report;

enabling the user to generate an extensible markup language (XML) script for a verification tool;

enabling the user to generate paragraph and tabular reports;

enabling the user to generate a CPI report that calculates an overall program residual risk; and enabling the user to modify the report structure as needed.

* * * * *